(12) United States Patent
Komatsu et al.

(10) Patent No.: US 6,636,371 B1
(45) Date of Patent: *Oct. 21, 2003

(54) MAGNETIC TRANSFER METHOD AND SYSTEM

(75) Inventors: Kazunori Komatsu, Odawara (JP); Makoto Nagao, Odawara (JP); Masakazu Nishikawa, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,326

(22) Filed: Apr. 26, 2000

(30) Foreign Application Priority Data

Apr. 26, 1999 (JP) .......................................... 11-117800

(51) Int. Cl.[7] ................................................ G11B 5/86
(52) U.S. Cl. ............................ 360/16; 360/15; 360/17
(58) Field of Search ................................... 360/16, 17

(56) References Cited

U.S. PATENT DOCUMENTS

| | | | | |
|---|---|---|---|---|
| 4,110,797 A | * | 8/1978 | Hoshino et al. | 360/17 |
| 4,422,106 A | * | 12/1983 | Sawazaki | 360/17 |
| 5,032,931 A | * | 7/1991 | Suzuki et al. | 360/17 |
| 6,181,492 B1 | * | 1/2001 | Bonyhard | 360/17 |
| 6,347,016 B1 | * | 2/2002 | Ishida et al. | 360/135 |

FOREIGN PATENT DOCUMENTS

| | | | | |
|---|---|---|---|---|
| JP | 360151843 A | * | 8/1985 | 360/17 |

* cited by examiner

*Primary Examiner*—David Hudspeth
*Assistant Examiner*—V. Kapadia
(74) *Attorney, Agent, or Firm*—Sughrue Mion, PLLC

(57) ABSTRACT

The invention provides a magnetic transfer method in which a magnetic transfer master carrier having a magnetic layer at a surface portion of a substrate having an information signal is brought in contact with a magnetic recording medium that is an associated slave medium and a transfer magnetic field is applied to the slave medium. The coercive force Hcs of the slave magnetic recording medium and the transfer magnetic field satisfies the relation:

0.6×Hcs≦transfer magnetic field≦1.3×Hcs

20 Claims, 23 Drawing Sheets

MAGNETIC TRANSFER METHOD AND SYSTEM

BACKGROUND OF THE INVENTION

The present invention relates generally to a method of recording much information in a magnetic recording medium in single operation, and more particularly to a method of transferring recording information to a large-capacity, high-recording density magnetic recording medium.

The quantity of information used with personal computers, etc. are now dramatically increased because of wide use of digital images, etc. With an increasing amount of information, there are now demanded mass-storage magnetic recording media that cost less and have ever-shorter write and read time.

High-density recording media such as hard disks and a high-density floppy disk type of magnetic recording media have an information recording area provided with tracks narrower than those used with ordinary floppy disks. To precisely scan narrow track widths with a magnetic head thereby recording and reading signals with high S/N ratios, precise scanning must be effected using tracking servo technology.

For this reason, mass-storage magnetic recording media such as hard disks and removal types of magnetic recording media represented by ZIP (Iomega Co., Ltd.) are currently subjected to the so-called preformatting wherein tracking servo signals, address information signals, read clock signals, etc. are preformatted in one track at a certain interval.

The magnetic head reads these preformatted signals to make correction for its own position, so that it can run over the tracks.

To fabricate a current preformat, a disk is recorded one by one and track by track, using a dedicated servo recorder. The servo recorder is expensive and long is needed for preformatting, resulting in an increased production time. This has some influences on production costs.

For this reason, a magnetic transfer system has been proposed instead of the track-by-track preformatting system. For instance, some transfer techniques are introduced in JP-A's 63-183623, 10-40544 and 10-269566. However, these publications say nothing about practical conditions for magnetic fields applied for magnetic transfer and practical means for generating such magnetic fields.

To provide a solution to such prior art problems, for instance, JP-A's 63-183623 and 10-40544 disclose a recording method. According to this method, a substrate is provided on its surface with a pit-and-projection configuration corresponding to information signals. Then, a ferromagnetic thin film is formed on the surface of at least the projection portion of the pit-and-projection configuration to form a magnetic transfer master carrier. While the surface of the master carrier is brought in contact with the surface of a sheet or disk form of magnetic recording medium having a ferromagnetic thin film or ferromagnetic powder coating layer, the ferromagnetic material forming the surface of the projection portion is energized by the application of an a.c. bias magnetic field or d.c. magnetic field, thereby recording a magnetization pattern corresponding to the pit-and-projection form on the magnetic recording medium.

In the aforesaid method, the surface of the projection portion of the master carrier is brought in close contact with the magnetic recording medium to be preformatted, i.e., a slave medium. At thee same time, the ferromagnetic material forming the projection portion is energized by transfer to form a given format on the slave medium. Thus, this method is characterized in that static recording is feasible without any relative displacement of the slave medium with respect to the magnetic transfer master carrier and so precise preformat recording is feasible. In addition, this method is characterized in that the time needed for recording is very short. Here it is noted that the problems with the aforesaid recording method using a magnetic head are that the recording time of a few minutes to a few tens of minutes is usually needed and the time needed for recording increases further proportional to recording capacity. With the magnetic transfer method, however, it is possible to finish transfer within 1 second irrespective of recording capacity and recording density.

Preformatting pattern transfer from the magnetic transfer master carrier is here explained with reference to FIGS. 1(A) and 1(B). FIG. 1(A) is a plane view in schematic form illustrating a magnetic layer surface of the magnetic transfer master carrier, and FIG. 1(B) is a sectional view illustrative of one transfer process.

A magnetic transfer master carrier 1 is provided at a given track area with a preformat area 2 having a pattern comprising the tracking serve signals and address signals to be transferred, and a data area 3. While the magnetic transfer master carrier 1 is brought in close contact with a slave medium 4, a transfer external magnetic field 6 is applied in a track direction 5, thereby transfer preformat information on the slave medium side in the form of recording information 7. Thus, the slave medium can be fabricated with high efficiency.

When transfer is carried out by such a method, however, it is found that the quality of some information signals often becomes worse with inaccurate servo operation.

An object of the present invention is therefore to provide a stable transfer method and system which can prevent inaccurate servo operation of a slave medium fabricated by a preformat pattern transfer process where while a magnetic transfer master carrier and a slave medium are brought in close contact with each other, an external magnetic field is applied to the salve medium.

BRIEF DESCRIPTION OF THE DRAWINGS

FIGS. 4(A) and 4(B) are illustrative of yet another magnetic application method.

SUMMARY OF THE INVENTION

Figure 1A:
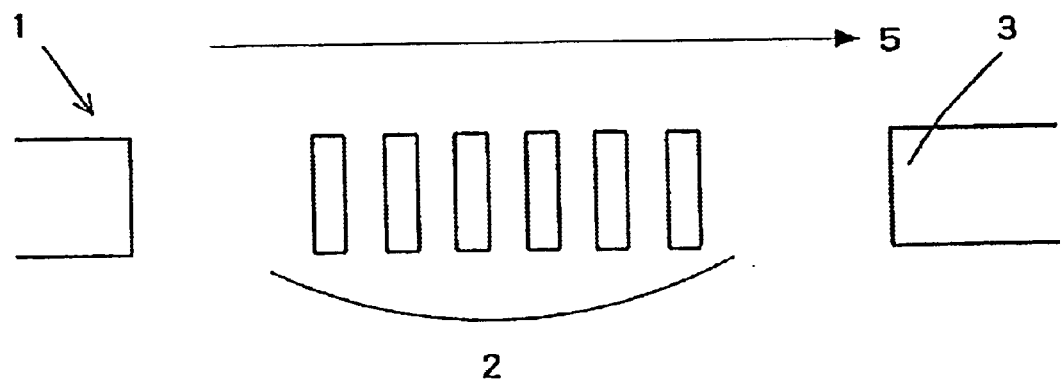
FIGS. 1(A) and 1(B) are illustrative of pattern transfer by a magnetic transfer master carrier.

The aforesaid objects are achievable by any one of the following inventions (1) to (22).

(1) A magnetic transfer method in which a magnetic transfer master carrier having a magnetic layer at a surface portion of a substrate having an information signal is brought in close contact with an associated slave medium and a transfer magnetic field is applied to the slave medium, wherein:

a magnetic field is previously applied to said slave medium in a track direction to initially d.c. magnetize said slave medium in said track direction, and said magnetic transfer master carrier is brought in close contact with said initially d.c. magnetized slave medium to apply said transfer magnetic field to said slave medium in said track direction for magnetic transfer.

(2) The magnetic transfer method according to (1) above, wherein said magnetic layer of said magnetic transfer master carrier has a coercive force Hcm of 600 Oe (48 kA/m) or lower.

(3) The magnetic transfer method according to (1) above, wherein said associated slave medium has a coercive force Hcs of 1,800 Oe (143 kA/m) or more.

(4) The magnetic transfer method according to (1) above, wherein the direction of said initial d.c. magnetization of said slave medium by application of said magnetic field in said track direction is opposite on a slave medium surface to that of said transfer magnetic field applied for magnetic transfer.

(5) The magnetic transfer method according to (1) above, wherein a magnetic field having a magnetic field intensity profile having a magnetic field intensity portion exceeding said coercive force Hcs of said slave medium at at least one position in said track direction is generated at a part of said track direction to rotate said slave medium or said magnetic field in said track direction, so that said magnetic field for said initial d.c. magnetization of said slave medium in said track direction is applied to said slave medium.

(6) The magnetic transfer method according to (1) above, wherein a magnetic field having a magnetic field intensity profile, which has a magnetic field intensity portion exceeding said coercive force Hcs of said slave medium in one direction alone at a track direction position and in which a magnetic strength in an opposite direction is less than said coercive force Hcs of said slave medium at any track direction position, is generated at a part of said track direction to rotate said slave medium or said magnetic field in said track direction, so that said magnetic field for said initial d.c. magnetization of said slave medium in said track direction is applied to said slave medium.

(7) The magnetic transfer method according to (1) above, wherein a magnetic field having a magnetic field intensity profile, in which a magnetic strength exceeding a maximum value of an optimum transfer magnetic field intensity range is absent in any track direction, at least one portion having a magnetic field intensity within said optimum transfer magnetic strength field range is present in one track direction and a magnetic field intensity in an opposite direction thereto is less than a minimum value of said optimum transfer magnetic field intensity range at any track direction position, is generated at a part of said track direction to rotate said slave medium in said track direction while said initially d.c. magnetized slave medium is brought in close contact with said or rotate said magnetic field in said track direction, so that said transfer magnetic field is applied to a slave medium surface in said track direction.

(8) The magnetic transfer method according to (5) above, wherein a magnetic pole axis of a permanent magnet is located vertically on one of upper and lower surface sides of said slave medium to apply to said slave medium a magnetic field symmetrical with respect to said magnetic pole axis to rotate said slave medium or said permanent magnet in said track direction, so that said slave medium is initially d.c. magnetized in said track direction.

(9) The magnetic transfer method according to (6) above, wherein a magnetic pole axis of a permanent magnet is located obliquely with respect to a slave medium surface to make an asymmetrical magnetic field intensity profile in said track direction and rotate said slave medium or said permanent magnet in said track direction, so that said slave medium is initially d.c. magnetized in said track direction.

(10) The magnetic transfer method according to (7) above, wherein an axis of a magnetic pole of a permanent magnet is located obliquely with respect to a slave medium surface to make an asymmetrical magnetic field intensity profile in said track direction and said initially d.c. magnetized slave medium is rotated in said track direction while said slave medium is brought in close contact with said magnetic transfer master carrier or said magnetic field is rotated in said track direction, so that said transfer magnetic field is applied to said slave medium in said track direction.

(11) The magnetic transfer method according to (7) or (10), wherein an optimum transfer magnetic field intensity is given by 0.6×Hcs to 1.3×Hcs where Hcs is the coercive force of said slave medium.

(12) A magnetic transfer system in which a magnetic transfer master carrier having a magnetic layer at a surface portion of a substrate having an information signal is brought in close contact with an associated slave medium and a transfer magnetic field is applied to the slave medium, which comprises:

initial d.c. magnetization means for previously applying a magnetic field to said slave medium in a track direction to initially d.c. magnetize said slave medium in said track direction, and transfer magnetic field application means for applying a transfer magnetic field to said initially d.c. magnetized slave medium in said track direction while said magnetic transfer master carrier is brought in close contact with said initially d.c. magnetized slave medium.

(13) The magnetic transfer system according to (12) above, wherein said magnetic layer of said magnetic transfer master carrier has a coercive force Hcm of 600 Oe (48 kA/m) or more.

(14) The magnetic transfer system according to (12) above, wherein said associated slave medium has a coercive force Hcs of 1,800 Oe (143 kA/m) or lower.

(15) The magnetic transfer system according to (12) above, wherein the direction of said initial d.c. magnetization of said slave medium by application of said magnetic field in said track direction is opposite on a slave medium surface to said transfer magnetic field applied for magnetic transfer.

(16) The magnetic transfer system according to (12) above, wherein said initial d.c. magnetization means comprises means for generating a magnetic field having a magnetic field intensity profile, which has a magnetic field intensity portion exceeding said coercive force Hcs of said slave medium at at least one position in said track direction, at a part of said track direction and rotating said slave medium or said magnetic field in said track direction.

(17) The magnetic transfer system according to (12) above, wherein said initial d.c. magnetization means comprises means for generating a magnetic field having a magnetic field intensity profile, which has a magnetic field intensity portion exceeding said coercive force Hcs of said slave medium in one direction alone at a track direction position and in which a magnetic strength in an opposite direction is less than said coercive force Hcs of said slave medium at any track direction position, at a part of said track direction to rotate said slave medium or said magnetic field in said track direction, so that said magnetic field for said initial d.c. magnetization of said slave medium in said track direction is applied to said slave medium.

(18) The magnetic transfer system according to (12) above, wherein said transfer magnetic field application means comprises means for generating a magnetic field having a magnetic field intensity profile, in which a magnetic strength exceeding a maximum value of an optimum transfer magnetic field intensity range is absent in any track direction, at least one portion having a magnetic field intensity within said optimum transfer magnetic strength field range is present in one track direction and a magnetic field intensity in an opposite direction thereto is less than a minimum value of said optimum transfer magnetic field intensity range at any track direction position, at a part of said track direction, and means for rotating said slave medium in said track direction while said initially d.c. magnetized slave medium is brought in close contact with said or rotating said magnetic field in said track direction, so that said transfer magnetic field is applied to a slave medium surface in said track direction.

(19) The magnetic transfer system according to (16) above, which comprises initial d.c. magnetization means including a single permanent magnet for locating a magnetic pole axis of said permanent magnet vertically on one of upper and lower surface sides of said slave medium to apply to said slave medium a magnetic field symmetrical with respect to said magnetic pole axis, and means for rotating said slave medium or said permanent magnet in said track direction, so that said slave medium is initially d.c. magnetized in said track direction.

(20) The magnetic transfer system according to (17) above, which comprises initial d.c. magnetization means including a single permanent magnet for locating a magnetic pole axis of said permanent magnet obliquely with respect to a slave medium surface to make an asymmetrical magnetic field intensity profile in said track direction and means for rotating said slave medium or said permanent magnet in said track direction, so that said slave medium is initially d.c. magnetized in said track direction.

(21) The magnetic transfer system according to (18) above, wherein said transfer magnetic field application means comprises a single permanent magnet magnetized in a vertical direction with respect to a slave medium surface and located obliquely with respect to said slave medium surface and on one of upper and lower surface sides of said slave medium to make an asymmetrical magnetic field intensity profile in said track direction and means for rotating said initially d.c. magnetized slave medium in said track direction while said slave medium is brought in close contact with said magnetic transfer master carrier or rotating said magnetic field in said track direction, so that said transfer magnetic field is applied to said slave medium in said track direction for magnetic transfer.

(22) The magnetic transfer system according to (18) or (21) above, wherein an optimum transfer magnetic field intensity is given by 0.6×Hcs to 1.3×Hcs where Hcs is the coercive force of said slave medium.

DESCRIPTION OF THE PREFERRED EMBODIMENT

The present invention has been accomplished through the inventors' findings that unstable transfer and low signal quality upon the application of an external transfer magnetic field to a slave medium in close contact with a magnetic transfer master carrier are caused due to the fact that the applied magnetic field is improper.

When an external magnetic field higher than the coercive force Hcs of the slave medium is applied to the slave medium for magnetic transfer from a magnetic transfer master carrier thereto, there is a general perception that the whole slave medium is magnetized in the direction of the applied magnetic field, and so the pattern to be essentially transferred cannot be recorded. For instance, JP-A 10-40544 teaches at the paragraph [0064] that the applied magnetic field should preferably be equal to or less than the coercive force of a magnetic recording medium.

Figure 1B:
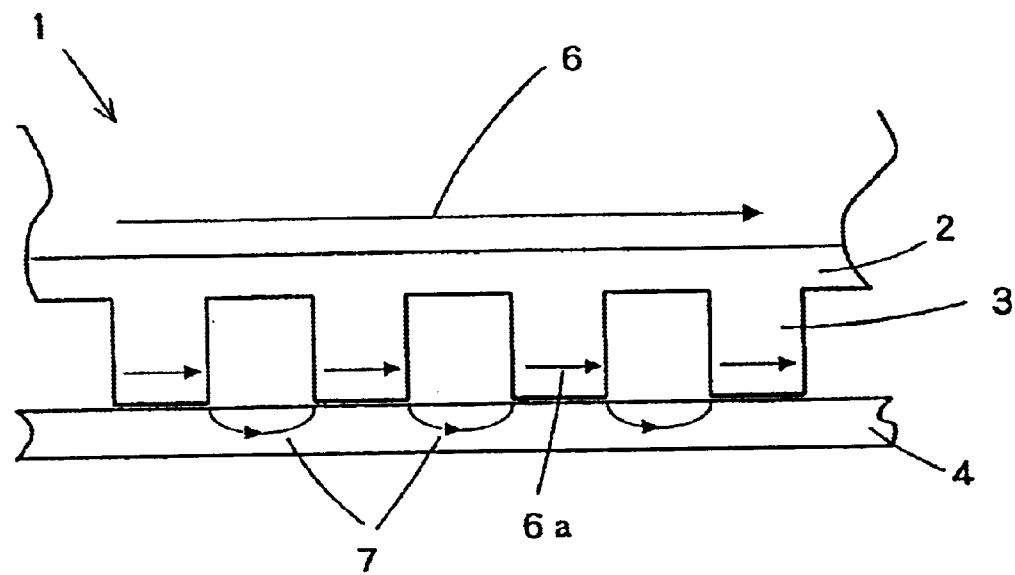

According to the inventors' studies concerning the principle of magnetic transfer, it has now been found that an external transfer magnetic field 6 is absorbed in a convex form of magnetic layer of a magnetic transfer master carrier 1 which is in substantial contact with a slave medium 4, as shown in FIG. 1(B). Consequently, the magnetic layer of the slave medium 4 in contact with the magnetic transfer master carrier 1 cannot have a magnetic field intensity at which recording is feasible, but the magnetic layer of the slave medium 4 corresponding to a concave portion of the magnetic transfer master carrier 1 in no contact with the slave medium 4 can have a magnetic field intensity at which recording is feasible. This in turn allows the magnetic layer of the slave medium 4 to be magnetized in the direction of the external transfer magnetic field 6, as shown by 7 in FIG. 1(B), so that the preformatting pattern on the magnetic transfer master carrier 1 can be transferred to the slave medium 4 in the form of recording information 7.

It is thus believed that in transfer from the magnetic transfer master carrier to the slave medium, the portion of the master carrier in contact with the slave medium is not inverted even when a transfer magnetic field higher than the coercive force Hcs is applied to the slave medium. This is because a large part of the magnetic field strikes on the pattern portion on the magnetic transfer master carrier. In other words, it is possible to obtain a slave medium of high signal quality by the application of a transfer magnetic field having a specific strength as compared with the coercive force Hcs of the slave medium.

To achieve clear transfer irrespective of any pattern, it is preferable that the slave medium is initially d.c. magnetized in one direction using a sufficiently large magnetic field greater than the coercive force Hcs, preferably a magnetic field at least 1.2 times as high as the coercive force Hcs, followed by application of a transfer magnetic field having a specific strength, i.e., a magnetic field within the optimum transfer magnetic strength range. The preferable transfer magnetic field is represented by $0.6 \times Hcs \leq$ Transfer Magnetic Field $\leq 1.3 \times Hcs$ This transfer magnetic field is applied in the opposite in direction to the direction of the initial d.c. magnetization.

The transfer magnetic field is more preferably between 0.8 Hcs and 1.2 Hcs, and even more preferably between 1 Hcs and to 1.1 Hcs.

The magnetic recording medium to be servo preformatted is generally a disk form of recording medium in which information is recorded along tracks drawn concentrically from the center of rotation. When a magnetic field is applied to such a disk form of magnetic recording medium for radial pattern transfer, the magnetic field is previously applied to a slave medium surface in its track direction, i.e., at an arbitrary track direction position and in a tangential direction of a circular arc to initially d.c. magnetize the slave medium in the track direction.

Then, the magnetic transfer master carrier is brought in close contact with the initially d.c. magnetized slave medium to apply the transfer magnetic field to a slave medium surface in its track direction for magnetic transfer. In this case, it is required that the direction of initial d.c. magnetization of the slave medium by the previous application of the magnetic field in the track direction be opposite on the slave medium surface to that of the transfer magnetic field applied for magnetic transfer.

To apply the magnetic field satisfying the above applied magnetic field requirement all over the surface of the disk form of recording medium, it is preferable to initially d.c. magnetize the slave medium by generating a magnetic field having a magnetic field intensity profile, which has a magnetic field intensity portion exceeding the coercive force Hcs of the slave medium at at least one position in the track direction, at a part of said track direction and allowing the slave medium or the magnetic field to make one rotation in the track direction.

It is also preferable to initially d.c. magnetize the slave medium in the track direction by producing a magnetic field having a magnetic field intensity profile, which has a magnetic field intensity portion exceeding the coercive force Hcs of the slave medium in one direction alone at a track direction position and in which a magnetic strength in an opposite direction thereto is less than the coercive force Hcs of the slave medium at any track direction position, at a part of the track direction and allowing the slave medium or the magnetic field to make one rotation in the track direction.

According to the present invention, it is preferable to generate a magnetic field having a magnetic field intensity profile, in which a magnetic strength exceeding a maximum value of an optimum transfer magnetic field intensity range is absent in any track direction, at least one portion having a magnetic field intensity within said optimum transfer magnetic strength field range is present in one track direction and a magnetic field intensity in an opposite direction thereto is less than a minimum value of said optimum transfer magnetic field intensity range at any track direction position, at a part of said track direction and rotating the initially d.c. magnetized slave medium in the track direction while the initially d.c. magnetized slave medium is brought in close contact with the magnetic transfer master carrier or rotating the magnetic field in the track direction, so that the transfer magnetic field is applied to the slave medium surface in the track direction.

According to the method of the present invention, it is also preferable to locate the axis of the magnetic pole of the permanent magnet obliquely with respect to the slave medium surface to provide an inclined transfer magnetic field. Preferably in this case, the optimum value of inclination of the axis of the magnetic pole should be such that the angle θ between the surface vertical to the axis of the magnetic pole and the slave medium surface is between 5° and 70°, and especially between 20° and 55° for a cuboidal permanent magnet, although varying depending on the configuration of the magnet.

The permanent magnet used for the initial d.c. magnetization and magnet transfer according to the present invention should preferably have a size equal to or larger than the distance between one end track and the other end track end on the slave medium. When the slave medium is a disk medium, the permanent magnet should preferably have a size equal to or larger than the radial distance between the outermost track and the innermost track. By use of the permanent magnet having such a size, it is possible to apply a uniform magnetic field to the slave medium surface. For this, it is only required to allow any one of the slave medium, an integral piece obtained by bringing the slave medium in close contact with the magnetic transfer master carrier and the permanent magnet to move in one direction along the overall track length or make one rotation.

The magnetic field intensity applied using the permanent magnet is required to be uniform throughout all track positions, i.e., have a strength variation of within preferably ±5%, and more preferably ±2.5% at all track positions.

While the present invention has been explained with reference to the embodiments wherein the permanent magnet is used to apply a magnetic field to the slave medium and magnetic transfer master carrier, it is understood that an electromagnet may be used to apply a magnetic field thereto.

The electromagnet, too, may be located such that its magnetic pole axis is inclined with respect to the slave medium surface. Preferably in this case, the optimum value of inclination of the magnetic pole axis should be such that the angle θ between the surface vertical to the axis of the magnetic pole and the slave medium surface is between 5° and 70°, and especially between 20° and 55° for a cuboidal electromagnet, although varying depending on the configuration of the magnet.

The electromagnet used for the initial d.c. magnetization and magnet transfer according to the present invention should preferably have a size equal to or larger than the distance between one end track and the other end track end on the slave medium. When the slave medium is a disk medium, the permanent magnet should preferably have a size equal to or larger than the radial distance between the outermost track and the innermost track. By use of the permanent magnet having such a size, it is possible to apply a uniform magnetic field to the slave medium surface. For this, it is only required to allow any one of the slave medium, an integral piece obtained by bring the slave medium in close contact with the magnetic transfer master carrier and the permanent magnet to move in one direction along the overall track length or make one rotation.

The magnetic field intensity applied using the electromagnet is required to be uniform throughout all track positions, i.e., have a strength variation of within preferably ±5%, and more preferably ±2.5% at all track positions.

When the electromagnet is used as the magnet in the transfer method and system of the present invention, it is possible to control the strength of the magnetic field acting on the slave medium by controlling the distance between the electromagnet and the slave medium, the inclination of the electromagnet with respect to the slave medium surface and the value of an exciting current fed to the electromagnet and, hence, effect magnetic transfer for various slave media and magnetic transfer master carriers having varying coercive forces.

A number of embodiments of the transfer method and system of the present invention are now explained with reference to the accompanying drawings.

Figure 2A:
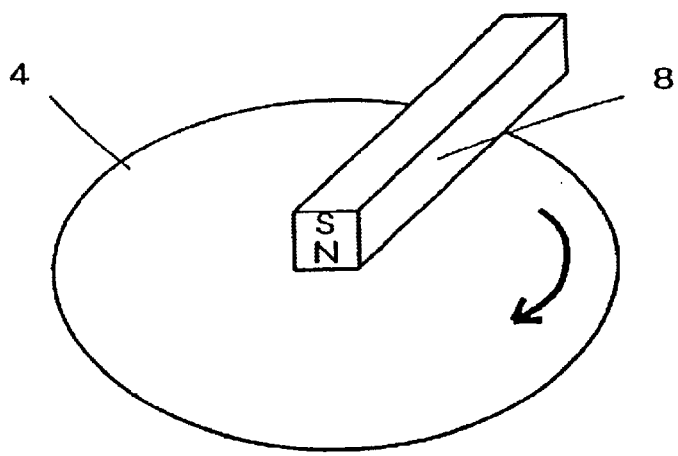
FIGS. 2(A), 2(B) and 2(C) are illustrative of a transfer method and system using a single permanent magnet having a magnetic field for a slave medium surface, which is symmetrical with respect to the center axis of a magnetic pole.
Figure 2B:
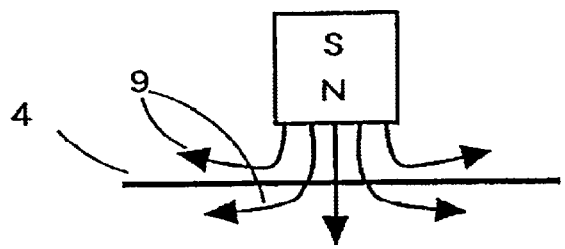
Figure 2C:
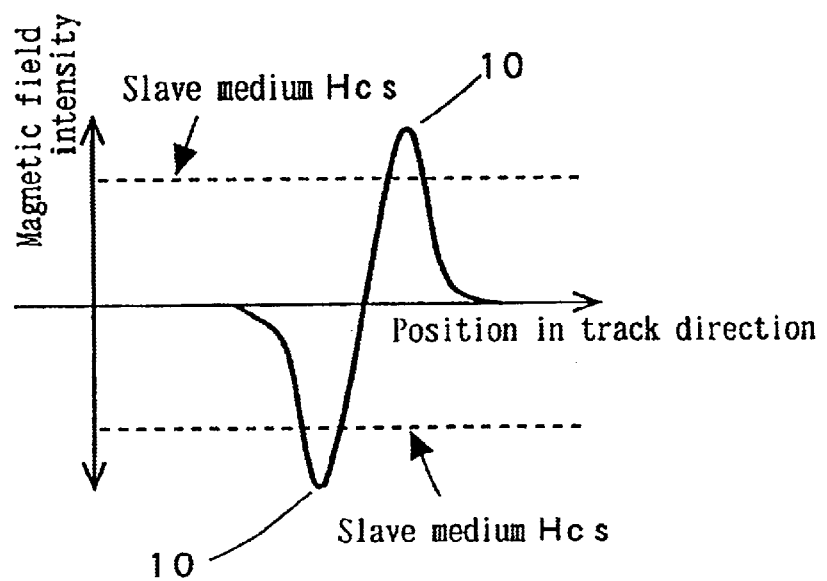

In the embodiment of the transfer method and system of the present invention shown in FIGS. 2(A) through 2(C), a single permanent magnet having a symmetrical magnetic field for a slave medium surface, which is symmetrical with respect to the center axis of the magnetic pole.

FIG. 2(A) is illustrative of how the slave medium is rotated while a magnetic field is applied by a permanent magnet 8 to the upper surface of a slave medium 4.

While a parallel magnetic field 9 in the track direction is applied from the single permanent magnet 8 provided over the upper surface of the slave medium 4 to the surface of the slave medium as shown in FIG. 2(B), the slave medium or the permanent magnet is rotated in the track direction with respect to the center axis of the slave medium. A magnetic field having a peak 10 exceeding the coercive force Hcs of the slave medium, as shown in FIG. 2(C), is applied to the surface of the slave medium for the initial d.c. magnetization thereof. Although the permanent magnet is provided over the upper surface side of the slave medium as shown in FIG. 2(A), it is understood the permanent magnet may be provided on the lower surface side of the slave medium.

Then, the slave medium is brought in close contact with the magnetic transfer master carrier. Subsequently, a magnetic field in the opposite direction to the initial d.c. magnetization direction is applied to the slave medium, so that the pattern on the magnetic transfer master carrier can be transferred to the slave medium.

Alternatively, a single permanent magnet magnetized vertically with respect to the slave medium surface may be positioned obliquely with respect to either one of the upper and lower surface sides of the slave medium to create an asymmetrical magnetic field intensity profile in the track direction. In this setting, the slave medium or the permanent magnet is rotated, thereby initially d.c. magnetizing the slave medium or transferring the pattern on the magnetic transfer master carrier to the slave medium.

Figure 3A:
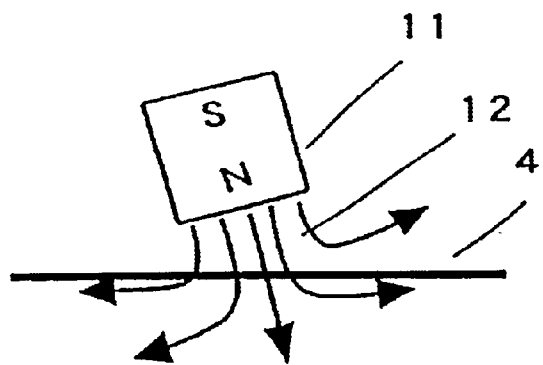
FIGS. 3(A) and 4(B) are illustrative of another magnetic field application method.
Figure 3B:
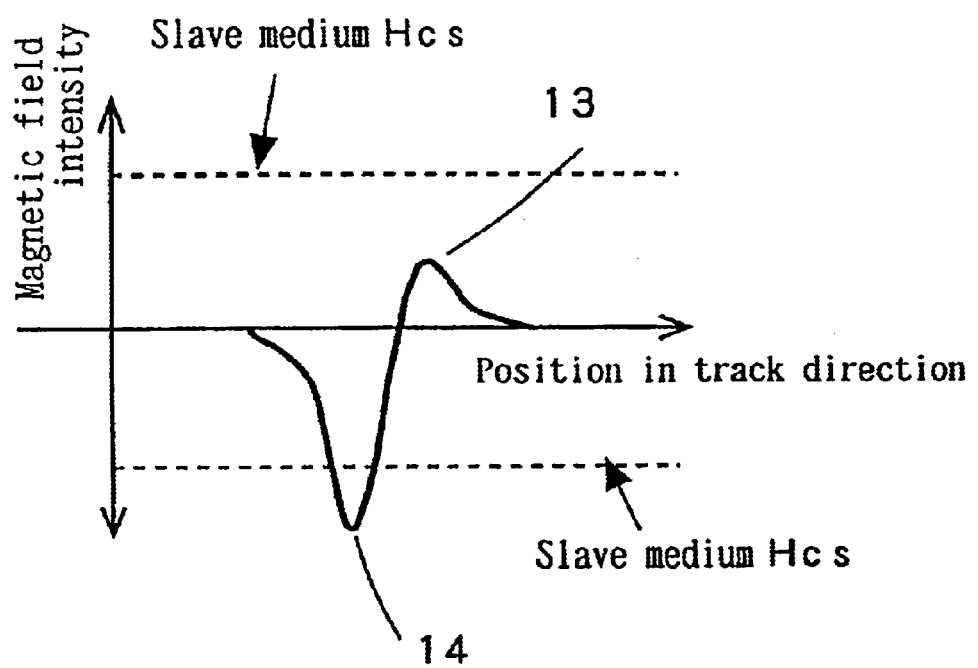

Another magnetic field application method is shown in FIGS. 3(A) and 3(B).

The application of an inclined magnetic field is illustrated in FIG. 3(A) and the magnetic field intensity obtained by the application of the magnetic field illustrated in FIG. 3(A) is illustrated in FIG. 3(B).

FIGS. 3(A) and 3(B) are illustrative of how an initial d.c. magnetic field is applied to the surface of a slave medium 4 using a gradient permanent magnet 11. An inclined magnetic field 9 is applied to the slave medium 4 to rotate the slave medium 4 or the gradient permanent magnet 11 in the track direction with respect to the center axis of the slave medium and thereby apply an asymmetrical magnetic field to the slave medium, so that the slave medium can be initially d.c. magnetized.

One peak 13 of reduced strength has no influence on the initial d.c. magnetization of the slave medium at all; only another peak 14 of increased strength takes part in the initial d.c. magnetization.

Figure 4A:
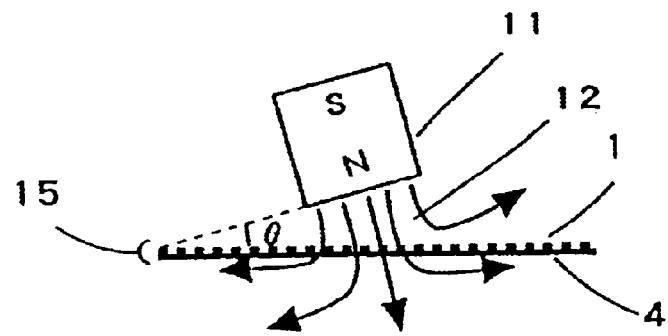
Figure 4B:
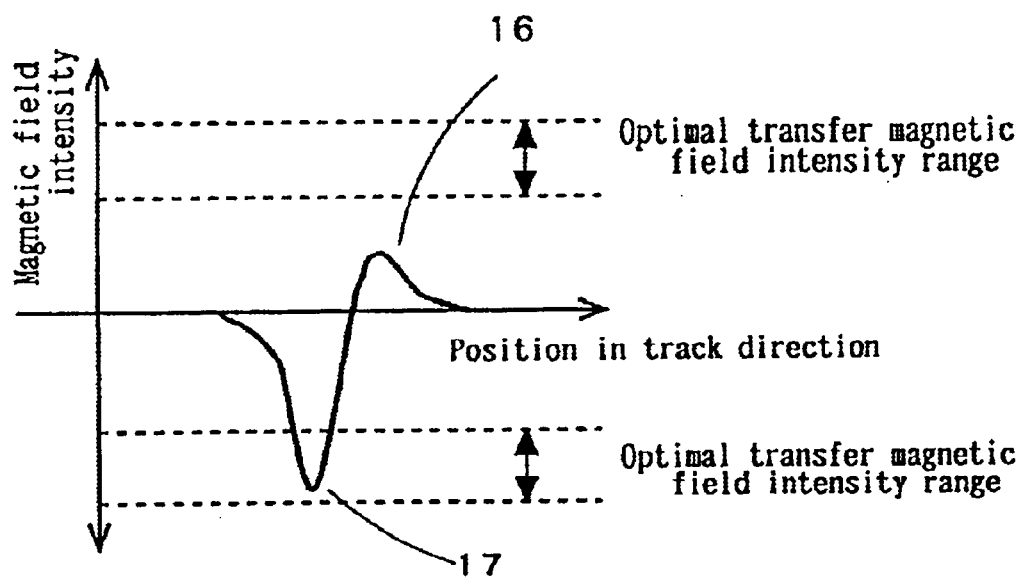

Yet another magnetic field application method is shown in FIGS. 4(A) and 4(B).

The application of an inclined magnetic field is illustrated in FIG. 4(A) and the magnetic field intensity obtained by the application of the magnetic field illustrated in FIG. 4(A) is illustrated in FIG. 4(B).

FIG. 4(A) is illustrative of how to apply a transfer magnetic field to the surface of an integral piece 15 comprising a slave medium 4 and a magentic transfer master carrier 1 close contact therewith, using an inclined permanent magnet 11. An inclined transfer magnetic field 12 is applied to the integral piece 15 to rotate the inclined permanent magnet 11 or the integral piece 15 in the track direction with respect to the center axis of the integral piece 15, whereby a magnetic field in the opposite direction to that of the initial d.c. magnetization is applied thereto.

A reduced-strength peak 16 of the asymmetrical magnetic field shows no influence at all on transfer of pattern transfer from the magnetic transfer master carrier to the slave medium; only a peak 17 of increased strength contributes to magnetic transfer.

The peak 17 of increased strength allows the optimum range of transfer magnetic field to be applied from the magnetic transfer master carrier to the slave medium, thereby making it possible to form a satisfactory pattern irrespective of the configuration of the pattern.

By allowing the strengths of the initial d.c. magnetic field and transfer magnetic field to have a proper magnitude, it is thus possible to form a preferable transfer pattern.

The systems used for the magnetic transfer methods shown in FIGS. 2 through 4 are each provided with a mechanism capable of arbitrarily controlling the distance between the slave medium and the permanent magnet. By controlling the distance between the slave medium and the permanent magnet, the desired magnetic field intensity can be obtained on the surface of the slave medium.

In addition to the distance control mechanism, each of the systems shown in FIGS. 3 and 4 is provided with a mechanism capable of arbitrarily controlling the angle of inclination of the permanent magnet, so that the strength of the magnetic field in the opposite direction to that of initial d.c. magnetization or the magnetic transfer magnetic filed can be controlled as desired.

Each of the methods of FIGS. 3 and 4 is nothing but one example of making an asymmetrical magnetic field profile at the track direction position using a substantially single permanent magnet. For instance, the asymmetrical magnetic field profile may be obtained by changing the configuration of the surface of the permanent magnet opposite to the slave medium or providing one block of combined permanent magnets or making inhomogeneous the magnetic material used for the permanent magnet. In this case, too, a magnetic pattern having such an asymmetrical strength profile as shown in FIGS. 3 and 4 may be obtained.

Further embodiments of the transfer methods and systems according to the present invention are now explained with reference to the drawings.

Figure 5A:
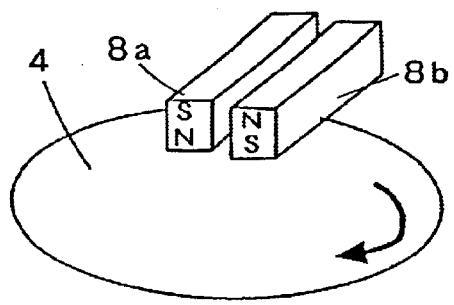
FIGS. 5(A), 5(B) and 5(C) are illustrative of how magnetic fields produced by two juxtaposed permanent magnets are applied to one surface of the slave medium.
Figure 5B:
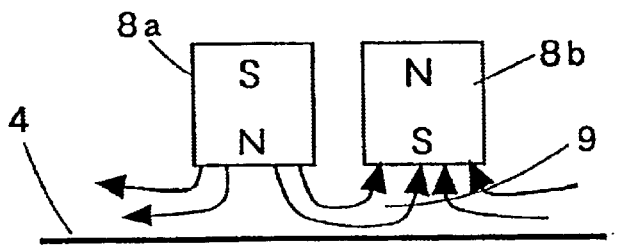
Figure 5C:
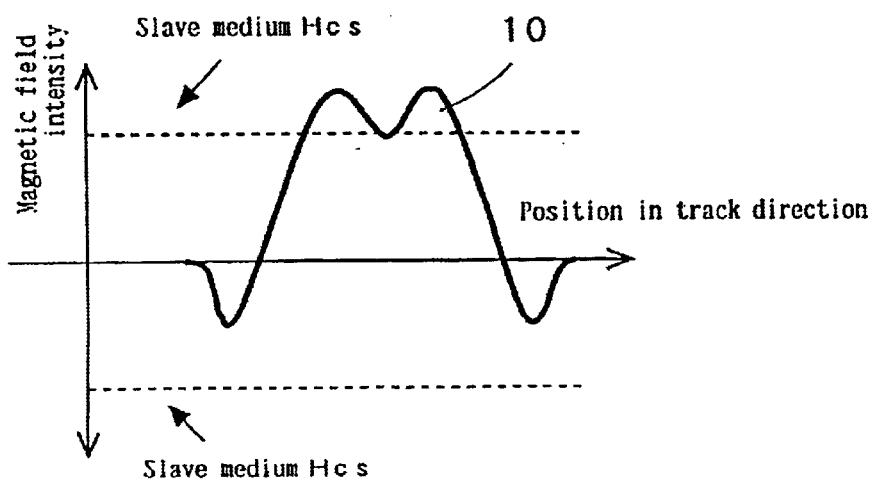

FIGS. 5(A) through 5(C) are illustrative of how two permanent magnets are juxtaposed over one surface of a slave medium to apply a magnetic field to the slave medium.

As shown in FIG. 5(A), two permanent magnets 8a and 8b are juxtaposed over at least one surface of a slave medium 4 in such a way that the magnetic pole directions of both magnets are opposite to each other, i.e., the polarities of the adjacent magnetic poles are opposite to each other, with the respective magnetic pole axes located vertically with respect to the slave medium. In such a setting, the slave medium 4 is rotated.

As explained above, the two permanent magnets 8a and 8b are juxtaposed over at least one surface of the slave medium 4 in such a way that the magnetic pole directions of both magnets are opposite to each other, i.e., the polarities of the adjacent magnetic poles are opposite to each other, with the respective magnetic pole axes located vertically with respect to the slave medium. As shown in FIG. 5(B), one permanent magnet 8a produces a magnetic field toward another permanent magnet 8b, and so provides a magnetic field 9 to be applied to the surface of the slave medium 4.

FIG. 5(C) is a diagram illustrative of the strength of the magnetic field applied to the slave medium. In the magnetic field applied to the slave medium, a peak 10 exceeding the coercive force Hcs of the slave medium is found, so that the slave medium can be initially d.c. magnetized by rotating the slave medium or the two permanent magnets.

If the slave medium is brought in close contact with a magnetic transfer master carrier and a magnetic field is applied in the opposite direction to the initial d.c. magnetization direction according to such a similar method as mentioned above, it is then possible to achieve pattern transfer from the magnetic transfer master carrier to the slave medium.

The distance between the juxtaposed magnets may be such that the magnetic field having a strength exceeding the coercive force of the slave medium can be applied to the slave medium.

Figure 6A:
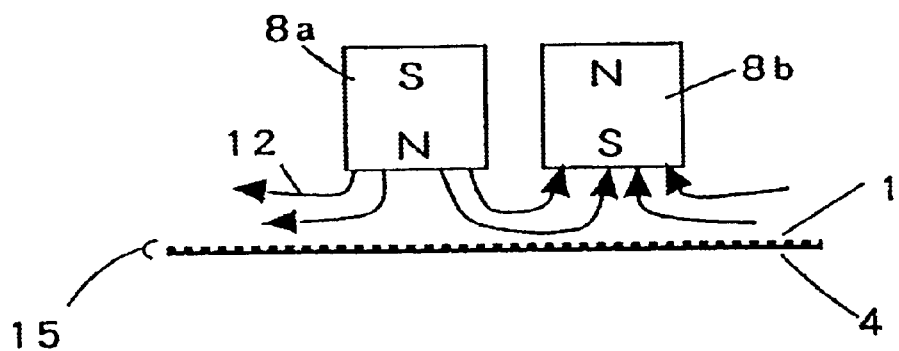
FIGS. 6(A) and 6(B) are illustrative of pattern transfer from the master carrier to the slave medium.
Figure 6B:
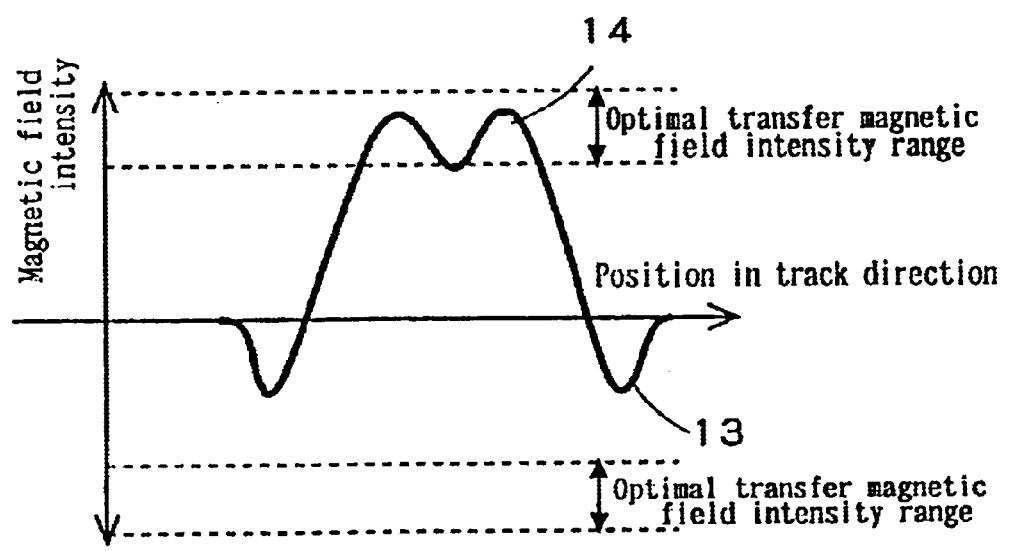

FIGS. 6(A) and 6(B) are illustrative of how the pattern on the magnetic transfer master carrier is transferred to the slave medium.

FIG. 6(A) is illustrative of how a magnetic field is applied to an integral piece obtained by bringing the slave medium in close contact with the magnetic transfer master carrier, and FIG. 6(B) is a diagram illustrative of the strength of the magnetic field applied as shown in FIG. 6(A).

Permanent magnets 8a and 8b, each having a symmetrical magnetic field with respect to its magnetic pole axis, are juxtaposed over the upper surface of an integral piece 15 comprising a slave medium 4 and a magnetic transfer master carrier 1 in close contact therewith in such a way that the polarities of the adjacent magnetic poles are opposite to each other, with the respective magnetic pole axes located vertically with respect to the integral piece. In this setting, the integral piece 15 is rotated.

As explained above, the permanent magnets 8a and 8b are juxtaposed over the upper surface of the integral piece 15 in such a way that the polarities of the adjacent magnetic poles are opposite to each other. As shown, one permanent magnet 8a produces a magnetic field toward another permanent magnet 8b, and so applies a transfer magnetic field 12 to the integral piece 15.

FIG. 6(B) is a diagram illustrative of the strength of the magnetic field applied to the slave medium in close contact with the magnetic transfer mater carrier.

A reduced-strength peak 13 of the strength profile of the magnetic field applied to the slave medium is so much smaller than the optimum transfer magnetic field intensity range that it has no influence at all on pattern transfer from the master carrier to the slave medium. Only a peak 14 of increased strength contributes to magnetic transfer. The peak 14 of increased strength also makes it possible to apply to the slave medium a magnetic field included in the optimum transfer magnetic field intensity range for pattern transfer from the magnetic transfer master carrier to the slave medium, thereby forming a satisfactory pattern irrespective of the configuration of the pattern.

The system used for each of the magnetic transfer methods shown in FIGS. 5 and 6 is provided with a mechanism capable of arbitrarily controlling the distance between the slave medium and the permanent magnets and the distance between the juxtaposed permanent magnets. By controlling the distance between the slave medium and the permanent magnets and the distance between the juxtaposed permanent magnets, it is thus possible to obtain the desired magnetic field intensity on the slave medium surface.

Figure 7A:
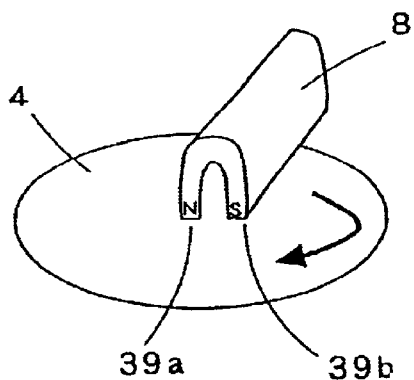
FIGS. 7(A), 7(B) and 7(C) are illustrative of how magnetic fields produced by two juxtaposed permanent magnets are applied to one surface of the slave medium.
Figure 7B:
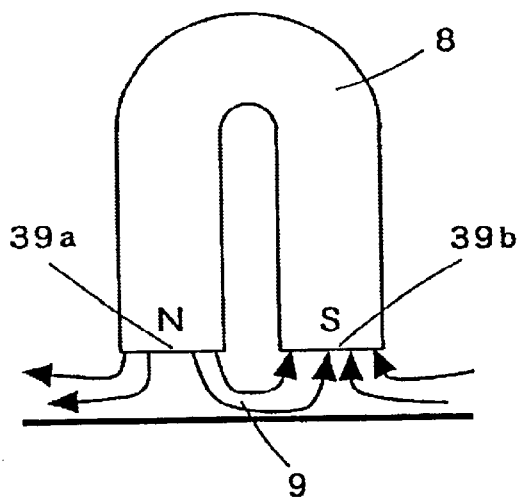
Figure 7C:
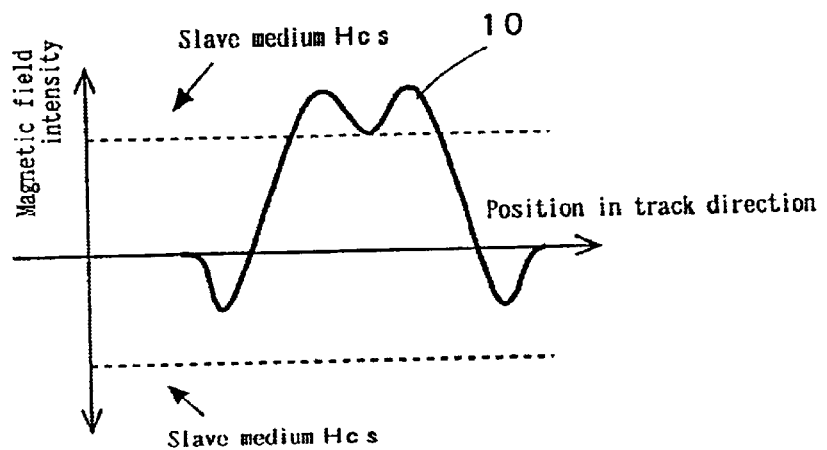

FIGS. 7(A) through 7(C) are illustrative of the transfer method and system of the present invention wherein a single permanent magnet is located over a slave medium surface with the end faces of both its magnetic poles opposing to the slave medium surface.

As shown in FIG. 7(A), a permanent magnet 8 is located over the upper surface of a slave medium 4 with the end faces 39a and 39b of both its magnetic poles opposing to the slave medium 4, thereby applying a magnetic field to the slave medium 4. In this setting, the slave medium is rotated.

While parallel magnetic fields 9 in a track direction are applied from the end faces 39a and 39b of both magnetic poles of the single permanent magnet 8 located over the upper surface of the slave medium 4 to the slave medium surface, as shown in FIG. 7(B), the slave medium or the permanent magnet is rotated in the track direction with respect to the center axis of the slave medium. A magnetic field having a peak 10 exceeding the coercive force Hcs of the slave medium such as one shown in FIG. 7(C) is applied to the slave medium surface so that it is initially d.c. magnetized. In the embodiment of FIG. 7(A), one permanent magnet is located over the upper surface of the slave medium. However, it is understood that one permanent magnet may be located on the lower surface side of the slave medium or two permanent magnets may be located over both surfaces of the slave medium.

Then, the slave medium is brought in close contact with the magnetic transfer master carrier, whereupon a magnetic field is applied to the slave medium in a direction opposite to that of the initial d.c. magnetization, so that a pattern on the magnetic transfer master carrier can be transferred to the slave medium.

The magnet used herein to apply the magnetic field to the slave medium or the integral piece comprising the slave medium and the magnetic transfer master carrier in close contact therewith may be any one of U-shaped magnets, horseshoe-shaped magnets, circular magnets, oval magnets and so on. The end faces of the magnet poles of the magnet used herein may be parallel with the slave medium surface as well as inclined with respect to the slave medium surface.

FIGS. 8(A) through 8(D) are illustrative of one embodiment of the permanent magnet that can be located over a slave medium surface with the end faces of both its magnetic poles opposing to the slave medium surface, so that both the magnetic poles can apply a magnetic field to the slave medium.

Figure 8A:
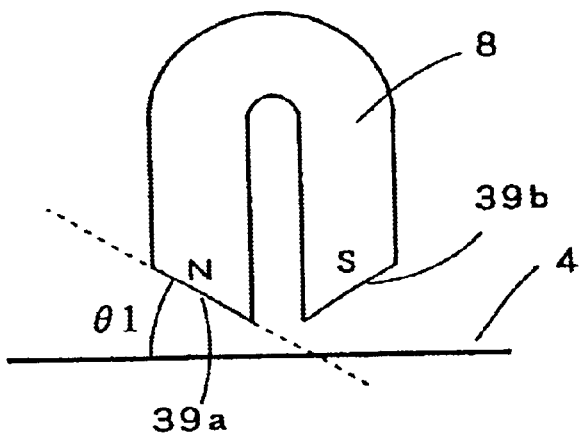
FIGS. 8(A), 8(B), 8(C) and 8(D) are illustrative of one embodiment of a permanent magnet wherein the end faces of both magnetic poles thereof are directed to a slave medium surface so that a magnetic field is applied by both magnetic poles to a slave medium.

A permanent magnet 8 shown in FIG. 8(A) has the end faces 39a and 39b of both its magnetic poles inclined outwardly with respect to a slave medium surface at an angle of outward inclination $\theta_1$, whereas the permanent magnet of FIG. 7(A) has both its end faces parallel with the slave medium.

The angle of outward inclination $\theta_1$ should be preferably 30° or smaller, and more preferably 10° or smaller.

Figure 8B:
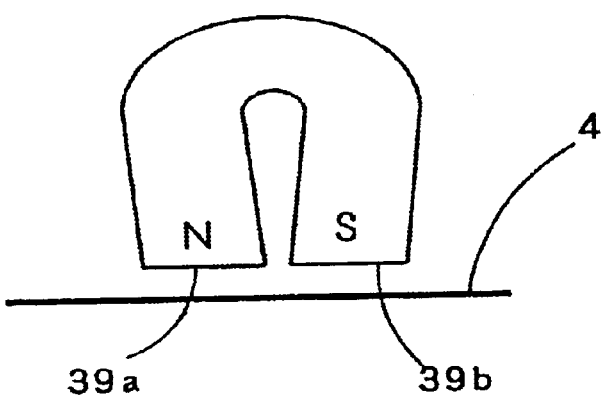

A permanent magnet 8 shown in FIG. 8(B) has the center axes of both its magnetic poles crossing over themselves rather than parallel with each other, whereas the permanent magnet of FIG. 7(A) is a U-shaped permanent magnet having the end faces 39a and 39b of both its magnetic poles parallel with the slave medium 4.

The end faces of both magnetic poles act as shown in FIG. 7(A) with the exception of their configurations, and so apply a magnetic field to the slave medium 4.

Figure 8C:
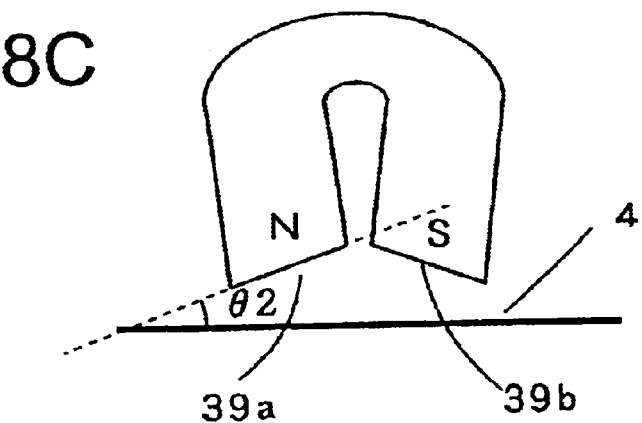

A permanent magnet 8 shown in FIG. 8(C) is the same as that of FIG. 8(B) with the exception that the end faces 39a and 39b of both its magnetic poles are inclined inwardly with respect to the surface of a slave medium 4 at an angle of inward inclination $\eta_2$. The angle of inward inclination $\theta_2$ of the end faces with respect to the slave surface should be preferably 90° or smaller, and more preferably 30° or smaller.

In the permanent magnet shown in FIG. 8(C), the center axes of both its magnetic poles cross over themselves. Instead of this permanent magnet, it is acceptable to use a U-shaped permanent magnet in which the center axes of both its magnetic poles are parallel with each other and the end faces of both its magnetic poles have an angle of inward inclination.

Figure 8D:
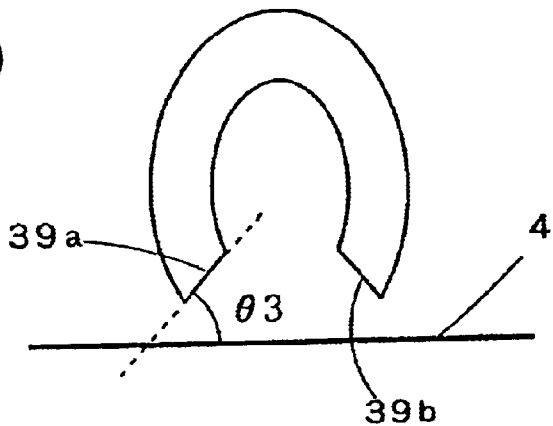

A permanent magnet 8 shown in FIG. 8(D) has a generally oval configuration, with the end faces 39a and 39b of both its magnetic poles inclined inwardly with respect to the surface of a slave medium 4 at an angle of inward inclination $\theta_3$.

As shown in FIG. 8(C), the angle of inward inclination $\theta_3$ of the end faces with respect to the slave surface should be preferably 90° or smaller, and more preferably 30° or smaller.

The permanent magnet used for the initial d.c. magnetization and magnet transfer according to the present invention should preferably have a size equal to or larger than the distance between one end track and the other end track end on the slave medium. When the slave medium is a disk medium, the permanent magnet should preferably have a size equal to or larger than the radial distance between the outermost track and the innermost track. By use of the permanent magnet having such a size, it is possible to apply a uniform magnetic field to the slave medium surface. For this, it is only required to allow any one of the slave medium, an integral piece comprising the slave medium and the magnetic transfer master carrier in close contact therewith and the permanent magnet to move in one direction along the overall track length or make one rotation.

The magnetic field intensity applied using the permanent magnet is required to be uniform throughout all track positions, i.e., have a strength variation of within preferably ±5%, and more preferably ±2.5% at all track positions.

Figure 9A:
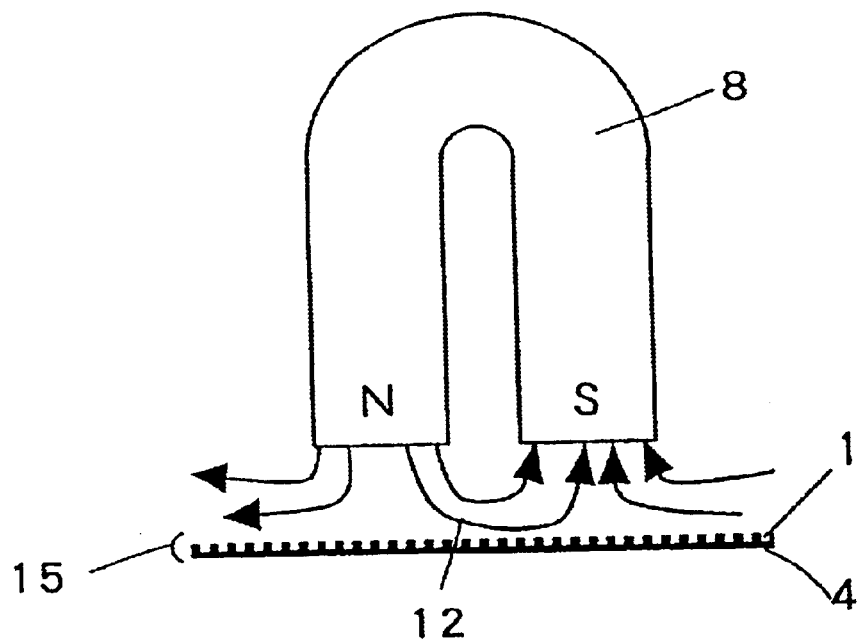
FIGS. 9(A) and 9(B) are illustrative of pattern transfer from a master carrier to a slave medium.
Figure 9B:
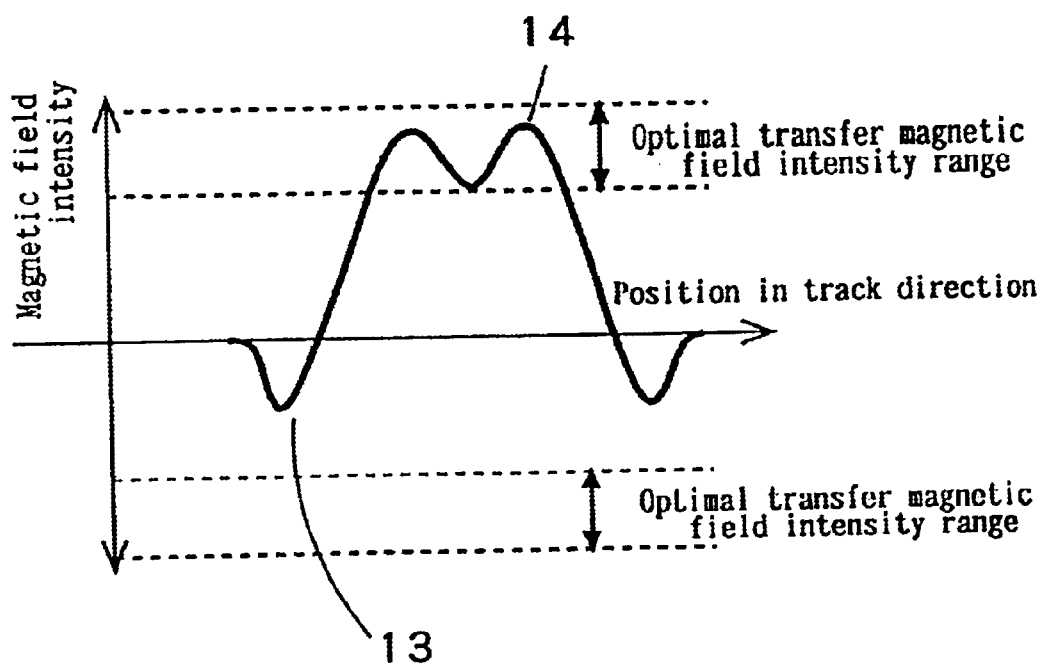

FIGS. 9(A) and 9(B) are illustrative of how to apply a magnetic field to an integral piece comprising a slave medium and a magnetic transfer master carrier in close contact therewith.

FIG. 9(A) is illustrative of the application of the magnetic filed, and FIG. 9(B) is a diagram illustrative of the strength of the magnetic field obtained by the application of the magnetic field as shown in FIG. 9(A).

A U-shaped permanent magnet 8 is located over the surface of an integral piece 15 comprising a slave medium 4 and a magnetic transfer master carrier 1 in close contact therewith while the end faces of its magnetic poles oppose to the slave medium, thereby applying a magnetic field 12 to the integral piece 15. In this state, the integral piece or the permanent magnet is rotated in a track direction with respect to the center axis of the integral piece, whereby a magnetic field is applied to the integral piece in the opposite direction to that of the initial d.c. magnetization.

A reduced-strength peak 13 of the magnetic field has no influence at all on pattern transfer from the magnetic transfer master carrier to the slave medium. Only a peak 14 of increased strength contributes to magnetic transfer.

The peak 14 of increased strength also makes it possible to produce a magnetic field included in the optimum transfer magnetic field intensity for pattern transfer from the magnetic transfer master carrier to the slave medium, thereby forming a satisfactory pattern irrespective of the configuration of the pattern.

Even when the permanent magnet shown in FIGS. 8(A) through 8(D) is used instead of the permanent magnet of FIGS. 9(A) and 9(B), a preferable transfer pattern can be formed by allowing the strength of the transfer magnetic field to have a proper magnitude.

In the above embodiment, the permanent magnet is located on one surface side of the slave medium to apply a magnetic field thereto. It is understood that two permanent magnets may be located on both surface sides of the slave medium.

The system used to carry out the magnetic transfer method shown in FIGS. 9(A) and 9(B) is provided with a mechanism capable of arbitrarily controlling the distance between the slave medium surface and the permanent magnet. By controlling the distance between the slave medium surface and the permanent magnet, it is possible to obtain the desired magnetic field intensity on the slave medium surface.

Figure 10A:
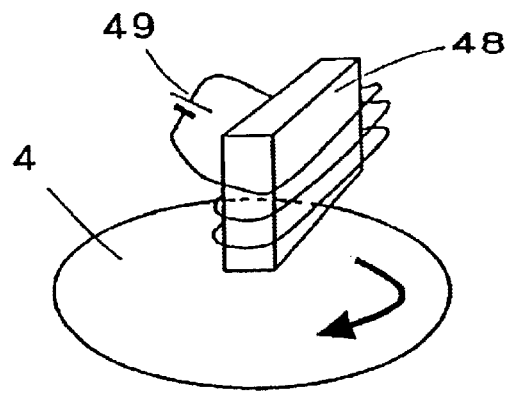
FIGS. 10(A), 10(B) and 10(C) are illustrative of how to apply a magnetic field produced by an electromagnet to one surface of a slave medium.
Figure 10B:
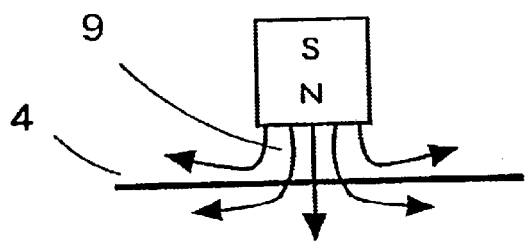

FIGS. 10(A) through 10(B) are illustrative of the method of locating an electromagnet over one surface of a slave medium to apply a magnetic field thereto.

Figure 10C:
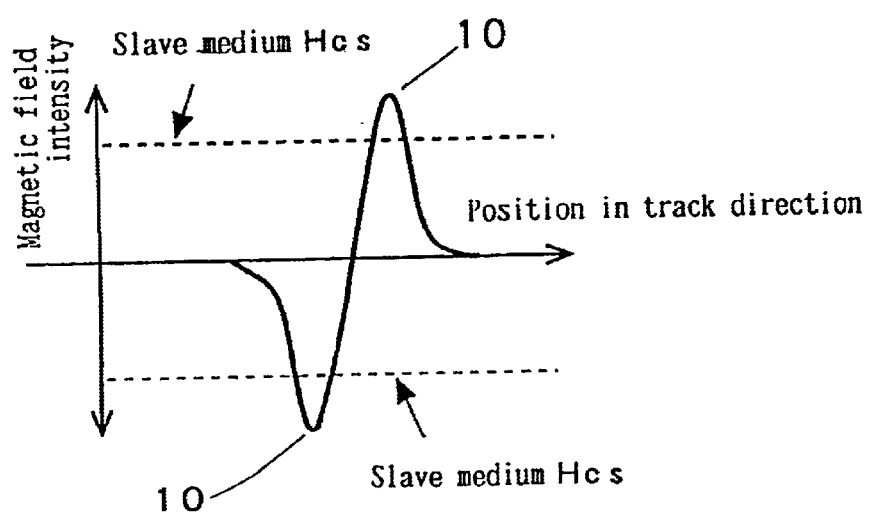

FIG. 10(A) is illustrative of how a slave medium is rotated while the magnetic field is applied by the electromagnet thereto, FIG. 10(B) is illustrative of the magnetic field applied to the slave medium, and FIG. 10(C) is a diagram illustrative of the strength of the magnetic field applied to the slave medium.

As shown in FIG. 10(A), a single electromagnet 48 located over the upper surface of a slave medium 4 is d.c. energized upon receipt of a direct current from a d.c. power source 49, and the axis of the magnetic pole formed by the electromagnet 48 is positioned vertically with respect to the slave medium surface.

As shown in FIG. 10(B), a magnetic field 9 is applied in parallel with the surface of the slave medium 4, whereby, as shown in FIG. 10(C), a magnetic field having a peak 10 exceeding the coercive force Hcs of the slave medium is applied to the slave medium for the initial d.c. magnetization thereof. In the embodiment of FIG. 10(A), the electromagnet is provided over the upper surface of the slave medium. However, it is understood that the electromagnet may be provided on the lower surface side of the slave medium.

Figure 11A:
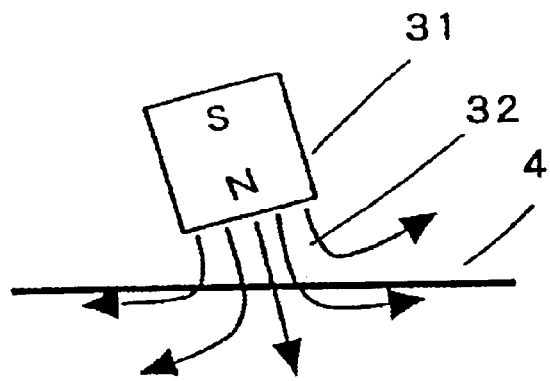
FIGS. 11(A) and 11(B) are illustrative of another magnetic field application method.
Figure 11B:
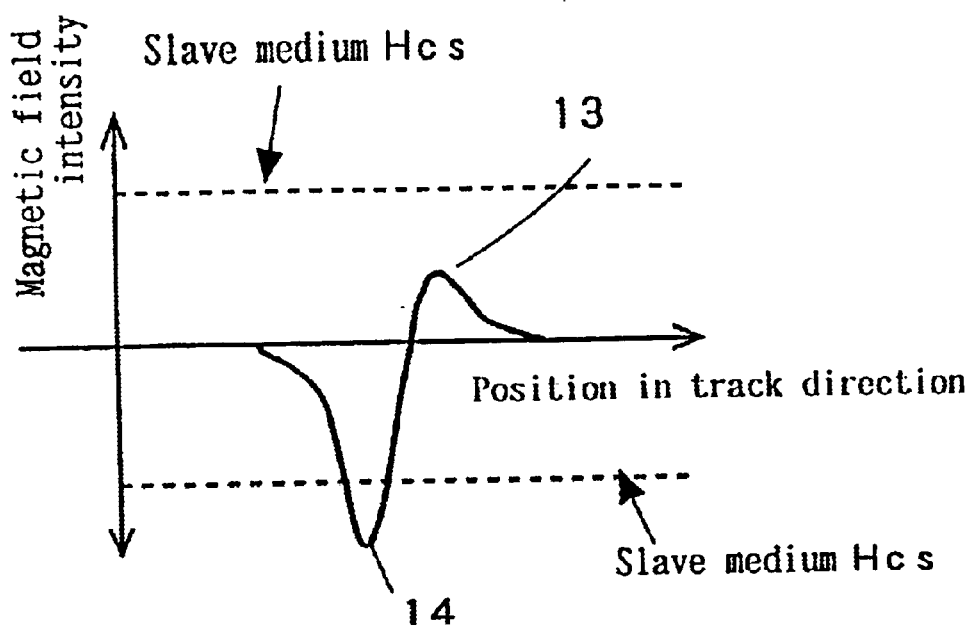

FIGS. 11(A) and 11(B) are illustrative of another magnetic field application method.

FIG. 11(A) is illustrative of the application of an inclined magnetic field, and FIG. 11(B) is a diagram illustrative of the strength of the magnetic field applied as shown in FIG. 11(A).

According to this embodiment, a d.c. energized inclined electromagnet 31 is used to apply an initial d.c. magnetic field to the surface of a slave medium 4. An inclined magnetic field 32 is applied to the slave medium 4 to rotate the slave medium 4 or the inclined electromagnet 31 in a track direction with respect to the center axis of the slave medium, so that the slave medium can be initially d.c. magnetized by the application of an asymmetrical magnetic field thereto.

Of peaks applied to the slave medium, one peak 13 of reduced strength has no influence at all on the initial d.c. magnetization of the slave medium. Only a peak 14 of increased strength has an action on the initial d.c. magnetization of the slave medium.

The strength of the magnetic field applied to the slave medium may be controlled by changing the energizing current for the electromagnet, the distance between the electromagnet and the slave medium, the angle of inclination of the inclined electromagnet, etc.

Figure 12A:
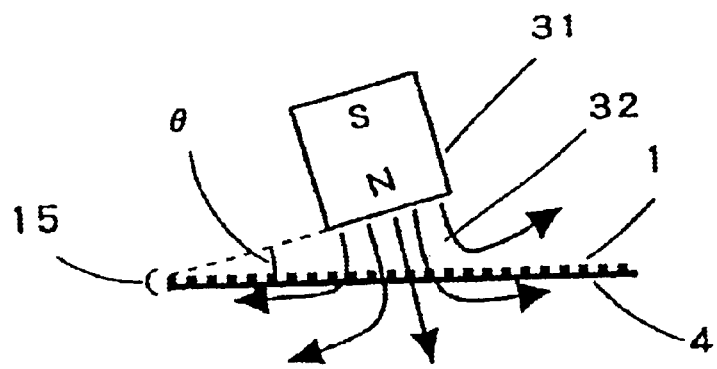
FIGS. 12(A) and 12(B) are illustrative of pattern transfer from a master carrier to a slave medium.
Figure 12B:
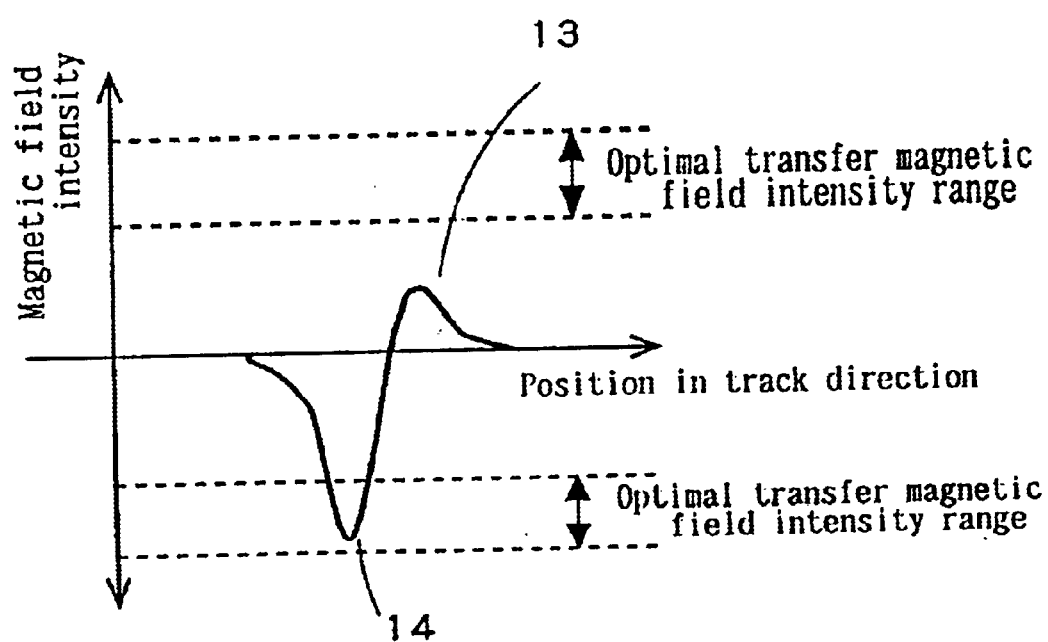

FIGS. 12(A) and 12(B) are illustrative of the pattern transfer method from a magnetic transfer master carrier to a slave medium.

FIG. 12(A) is illustrative of how a magnetic field is applied to an integral piece comprising a slave medium and a magnetic transfer master carrier in close contact therewith, and FIG. 12(B) is a diagram illustrative of the strength of the magnetic field applied as shown in FIG. 12(A).

A d.c. energized inclined electromagnet 31 is located over the upper surface of an integral piece 15 comprising a slave medium 4 and a magnetic transfer master carrier 1 in close contact therewith to rotate the integral piece 15 or the inclined electromagnet 31 in a track direction with respect to the center axis of the integral piece 15, whereby an asymmetrical magnetic field is applied to the integral piece for magnetic transfer.

A reduced-strength-peak 13 of the strength profile of the magnetic field applied to the slave medium is so much smaller than the optimum transfer magnetic field intensity range that it has no influence at all on pattern transfer from the master carrier to the slave medium. Only a peak 14 of increased strength contributes to magnetic transfer. The peak 14 of increased strength also makes it possible to apply to the slave medium a magnetic field included in the optimum transfer magnetic field intensity range for pattern transfer from the magnetic transfer master carrier to the slave medium, thereby forming a satisfactory pattern irrespective of the configuration of the pattern.

The system used to carry out the magnetic transfer method shown in FIGS. 12(A) is provided with a mechanism capable of controlling the distance between the slave medium surface and the electromagnet, the inclination of the electromagnet, the energizing current, etc. By controlling the distance between the slave medium and the electromagnet, it is possible to obtain the desired magnetic field intensity on the slave medium surface. The electromagnet used herein may be any one of air-core solenoid coils and coils having an iron or other core at their centers.

Figure 13A:
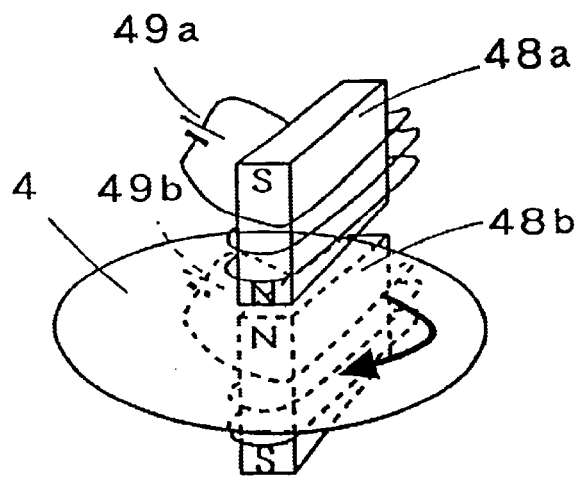
FIGS. 13(A), 13(B) and 13(C) are illustrative of how two opposite electromagnets are used for the application of a magnetic field.
Figure 13B:
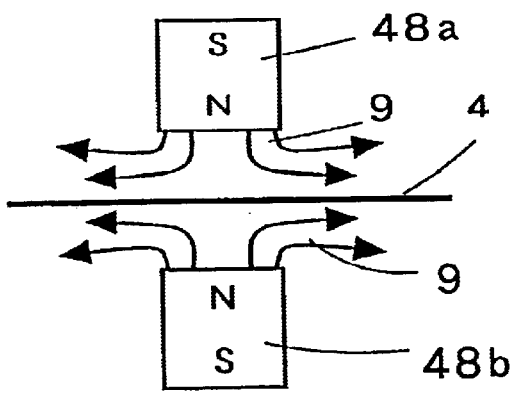
Figure 13C:
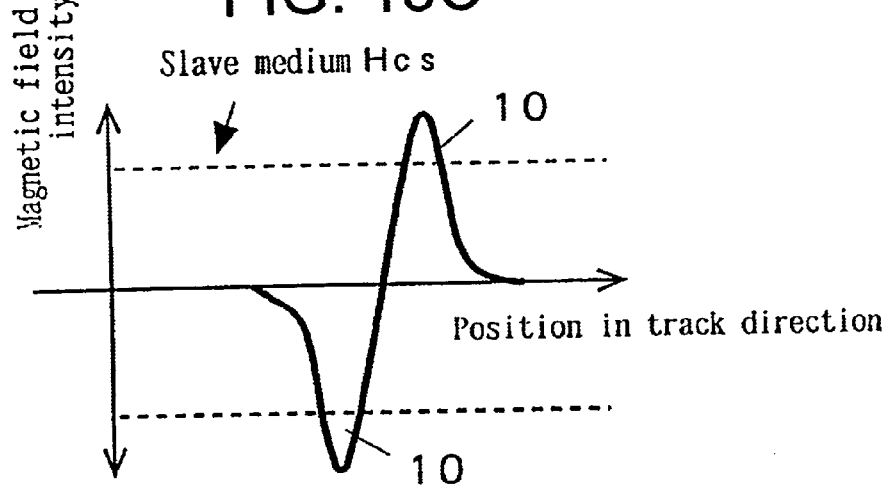

FIGS. 13(A) through 13(C) are illustrative of the method of applying a magnetic field using two electromagnets.

As shown in FIG. 13(A), electromagnets 48a and 48b magnetized symmetrically with respect to their magnetic pole axes are located over the upper and lower surfaces of a slave medium 4 while the same magnetic poles are opposite to each other. In this setting, the slave medium is then rotated. Energizing currents are applied from d.c. power sources 49a and 49b to the electromagnets 48a and 48b, respectively. Magnetic fields 9 are applied to the surfaces of the slave medium 4 from the electromagnets 48a and 48b provided on the upper and lower surface sides of the slave medium 4.

FIG. 13(C) is a diagram illustrative of the magnetic field intensity applied to the slave medium. In the magnetic field applied to the slave medium, a peak 10 exceeding the coercive force Hcs of the slave medium is so found that the slave medium can be initially d.c. magnetized by rotating the slave medium or rotating the electromagnets.

Figure 14A:
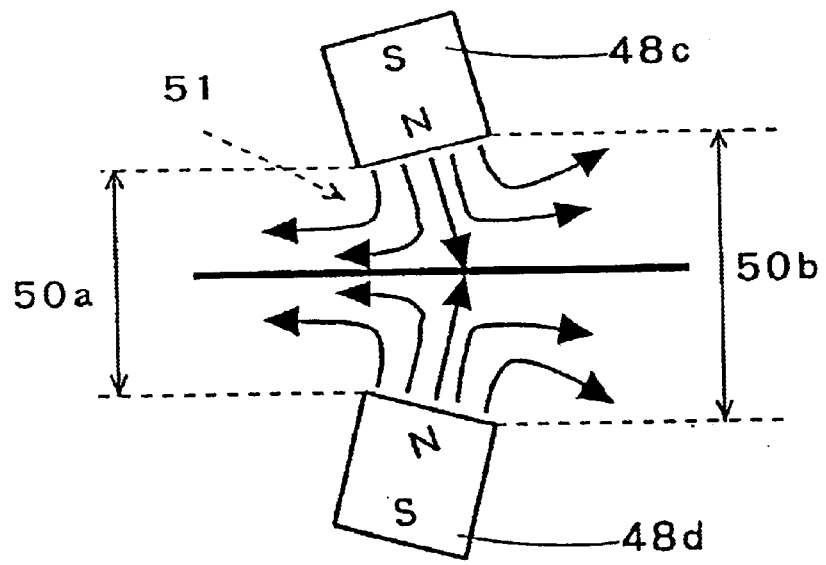
FIGS. 14(A) and 14(B) are illustrative of another magnetic field application method.
Figure 14B:
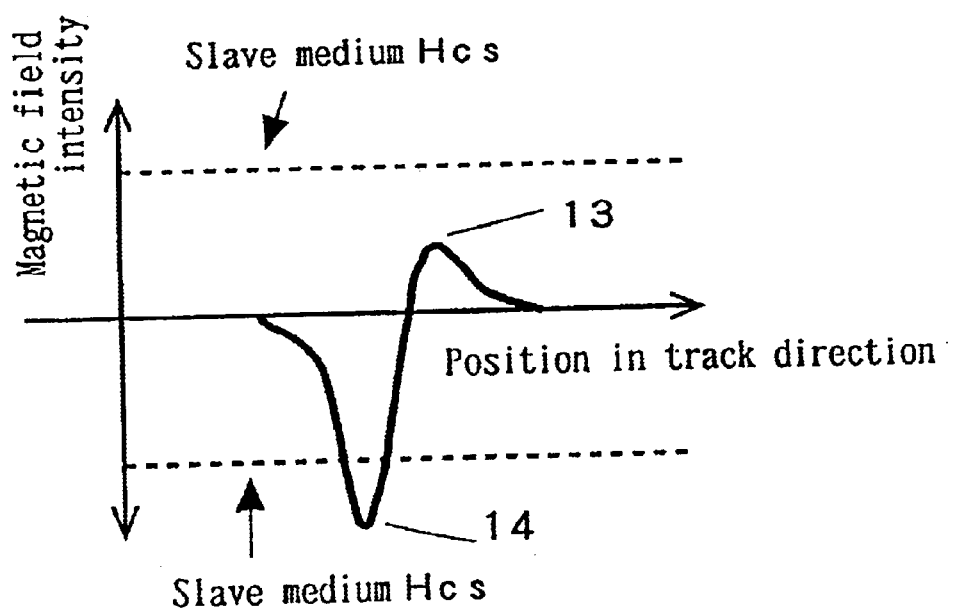

FIGS. 14(A) and 14(B) are illustrative of another magnetic field application method.

FIG. 14(A) is illustrative of how an asymmetrical magnetic field is applied, and FIG. 14(B) is a diagram illustrative of the strength of the magnetic field applied as shown in FIG. 14(A).

Electromagnets 48c and 48d, which are magnetized symmetrically with respect to their magnetic pole axes using a d.c. energizing current, are located with a slave medium 4 positioned between the opposing same magnetic poles thereof. The electromagnets are then obliquely arranged in such a way that the distance 50a between the electromagnets at one end in a track direction differs from the distance 50b between the electromagnets at the other end, thereby generating an asymmetrical magnetic field intensity profile in the track direction. Asymmetrical magnetic fields 51 are applied to the surfaces of the slave medium 4 to rotate the slave medium 4 or the inclined electromagnets 48c and 48d in the track direction with respect to the center axis of the slave medium 4, so that all the surfaces of the slave medium are initially d.c. magnetized by the application of the asymmetrical magnetic fields thereto.

One reduced-strength peak 13 of the asymmetrical magnetic field has no influence at all on the initial d.c. magnetization of the slave medium, and only a peak 14 of increased strength has an action on the initial d.c. magnetization of the slave medium.

Figure 15A:
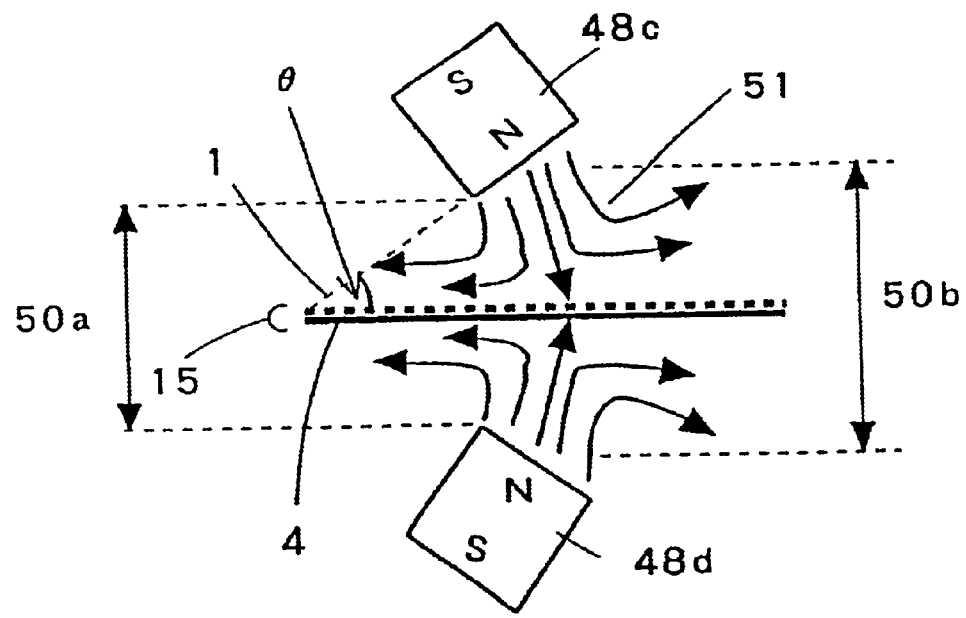
FIGS. 15(A) and 15(B) are illustrative of yet another magnetic field application method.
Figure 15B:
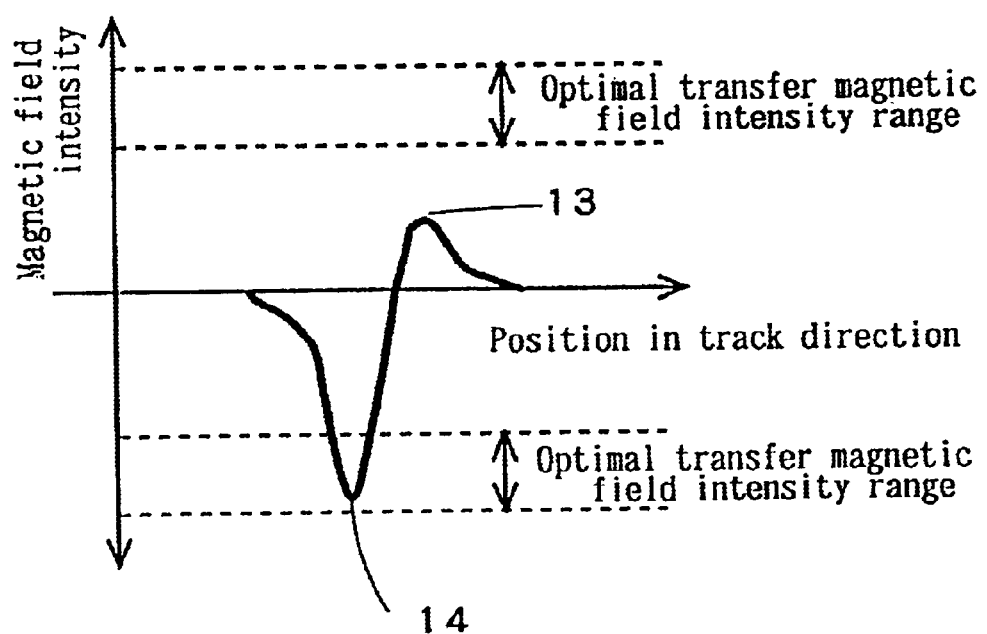

FIGS. 15(A) and 15(B) are illustrative of yet another magnetic field application method.

FIG. 15(A) is illustrative of how an asymmetrical magnetic field is applied to an integral piece comprising a slave medium and a master carrier in close contact therewith, and FIG. 15(B) is a diagram illustrative of the strength of a magnetic field applied as in FIG. 15(A).

Electromagnets 48c and 48d, which are magnetized symmetrically with respect to their magnetic pole axes using a d.c. energizing current, are located with an integral piece 15 positioned between the opposing same magnetic poles thereof, said integral piece 15 comprising an initially d.c. magnetized slave medium 4 and a master carrier 1 in close contact therewith. The electromagnets are then obliquely arranged in such a way that the distance 50a between the electromagnets at one end in a track direction differs from the distance 50b between the electromagnets at the other end, thereby generating an asymmetrical magnetic field intensity profile in the track direction. Thus, an asymmetrical magnetic field 51 is applied to the surface of the slave medium 4, thereby rotating at least one of the integral piece 15 and the inclined electromagnets 48c and 48d, so that magnetic fields can be applied to all the surfaces of the integral piece 15 in the opposite direction to that of the initial d.c. magnetization.

One reduced-strength peak 13 of the asymmetrical magnetic field has no influence at all on pattern transfer from the magnetic transfer master carrier to the slave medium, and only a peak 14 of increased strength contributes to magnetic transfer.

The peak 14 of increased strength ensures a magnetic field included within the maximum transfer magnetic field intensity range for pattern transfer from the magnetic transfer master carrier to the slave medium, and so a satisfactory pattern can be formed irrespective of the configuration of the pattern to be transferred.

The system used to carry out each of the magnetic transfer methods of FIGS. 13 to 15 is provided with a mechanism capable of arbitrarily controlling the distance of the slave medium surface and the electromagnets and the energizing current supplied to the electromagnets. By controlling at least one of the distance of the slave medium surface and the electromagnets and the energizing current, it is thus possible to obtain the desired magnetic field intensity on the slave medium surface.

In addition to the distance control mechanism, each of the systems shown in FIGS. 14 and 15 is provided with a mechanism capable of arbitrarily controlling the angle of inclination of the electromagnets, so that the strength of the magnetic field in the opposite direction to that of initial d.c. magnetization or the magnetic transfer magnetic filed can be controlled as desired. The electromagnets used herein may be any one of air-core solenoid coils or coils having iron or other cores at their centers.

Each of the methods of FIGS. 14 and 15 is nothing but one example of making an asymmetrical magnetic field profile at the track direction position using substantially two electromagnets. For instance, the asymmetrical magnetic field profile may be obtained by changing the configuration of the surface of the electromagnets opposite to the slave medium or providing one block of combined small electromagnets or making inhomogeneous the magnetic material used for the electromagnets. In this case, too, a magnetic pattern having such an asymmetrical strength profile as shown in FIGS. 14 and 15 may be obtained.

Figure 16A:
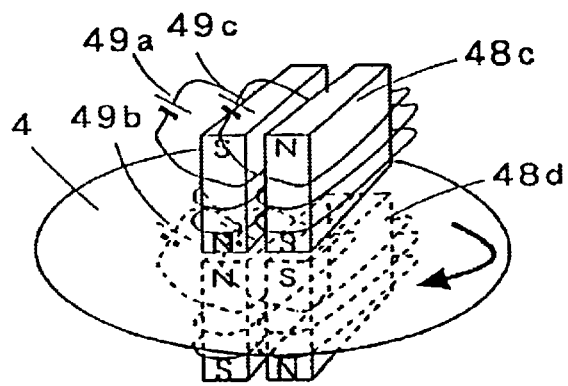
FIGS. 16(A), 16(B) and 16(C) are illustrative of how two pairs of juxtaposed electromagnets are positioned with a slave medium sandwiched therebetween, so that magnetic fields are applied vertically to the surfaces of a slave medium.
Figure 16B:
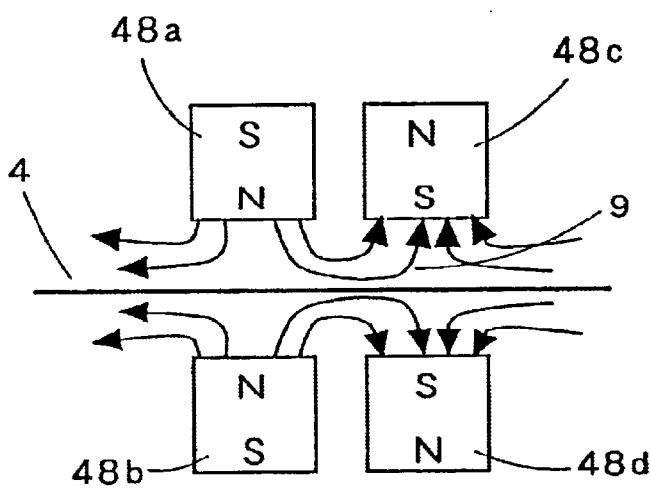
Figure 16C:
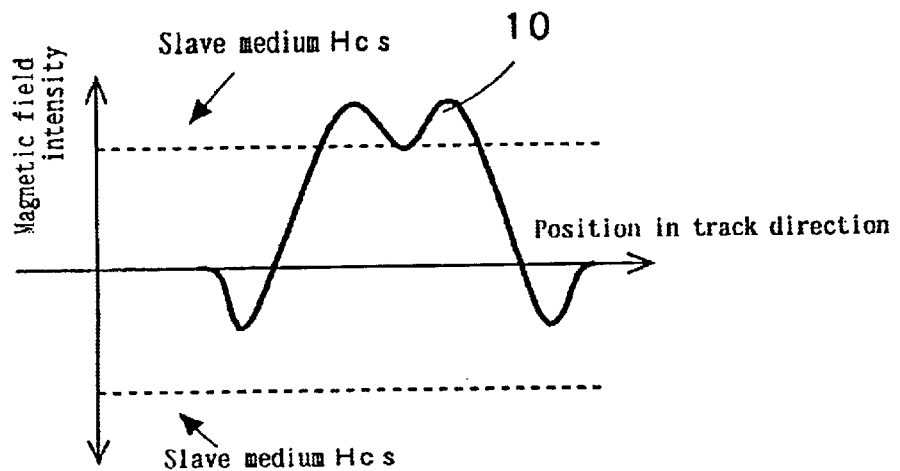

FIGS. 16(A) through 16(C) are illustrative of how to apply a magnetic field to a slave medium surface from two pairs of electromagnets positioned vertically to the slave medium surface while the slave medium is sandwiched between them.

As shown in FIG. 16(A), one pair of electromagnets 48a and 48b having a magnetic field symmetrical with respect to their magnetic pole axes are positioned on the upper and lower surface sides of a slave medium 4 with the same magnetic magnetic poles opposing to each other. Another pair of electromagnets 48c and 48d are juxtaposed to the one pair of electromagnets 48a and 48b in such a way that the polarities of the former are opposite to those of the latter. In such settings, the slave medium 4 is rotated. From associated d.c. power sources 49a, 49b, 49c and 49d, d.c. energizing currents are supplied to the electromagnets 48a, 48b, 48c and 48d.

As explained above, the electromagnets 48a and 48b are independently positioned on the upper and lower surface sides of the slave medium 4 with the same poles opposing to each other. As shown in FIG. 16(B), the magnetic fields of 48a and 48b repel each other and the magnetic field of 48a directs toward the adjacent electromagnet 48c while the magnetic field of 48b directs toward the adjacent magnets 48d. Thus, a magnetic field 9 is applied to the surface of the slave medium 4.

FIG. 16(C) is a diagram illustrative of the strength of the magnetic field applied to the slave medium. The magnetic field applied to the slave medium has a peak 11 exceeding the coercive force Hcs of the slave medium, and so the slave medium can be initially d.c. magnetized by rotating the slave medium or the rotating the electromagnets.

The distance between the juxtaposed electromagnets should preferably be such that they can apply to the slave medium a magnetic filed having a strength of greater than the coercive force of the slave medium.

Figure 17A:
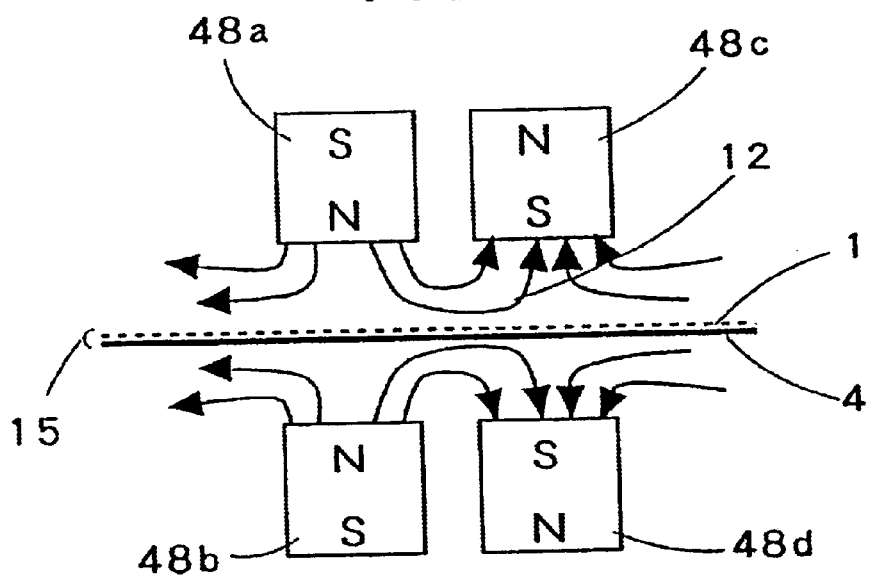
FIGS. 17(A) and 17(B) are illustrative of pattern transfer from a master carrier to a slave medium.
Figure 17B:
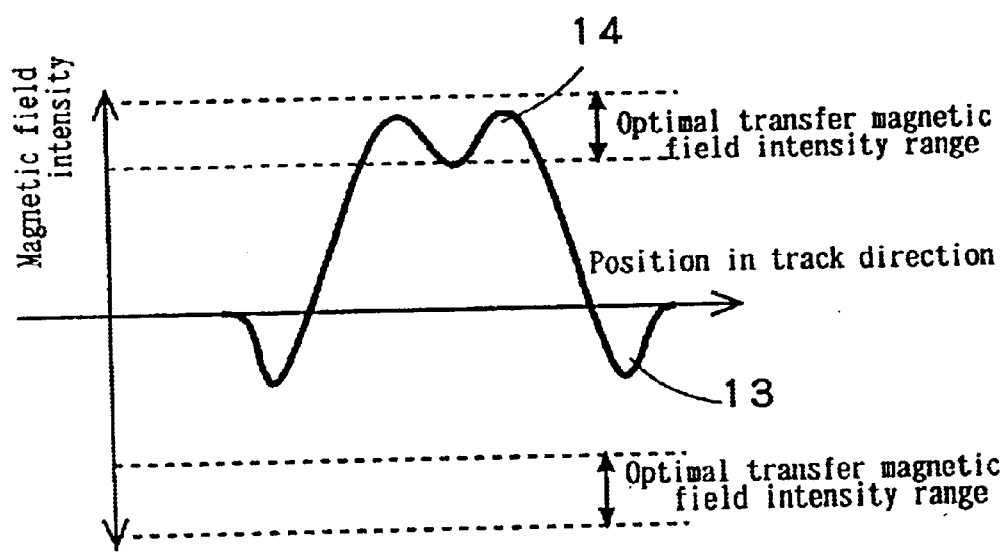

FIGS. 17(A) and 17(B) are illustrative of the transfer method from a magnetic transfer master carrier to a slave medium.

FIG. 17(A) is illustrative of the application of a magnetic field to an integral piece comprising a slave medium and a master carrier in close contact therewith, and FIG. 17(B) is a diagram illustrate of the strength of the magnetic field applied as shown in FIG. 17(A).

As shown in FIG. 17(A), one pair of electromagnets 48a and 48b having a magnetic field symmetrical with respect to their magnetic pole axes are positioned on the upper and lower surface sides of an integral piece 15 with the same magnetic poles opposing to each other, said integral piece 15 comprising a slave medium 4 and a master carrier 1 in close contact therewith. Another pair of electromagnets 48c and 48d are juxtaposed to the one pair of electromagnets 48a and 48b in such a way that the polarities of the former are opposite to those of the latter. In such settings, the integral piece 15 is rotated.

As explained above, the electromagnets 48a and 48b are independently positioned on the upper and lower surface sides of the integral piece 15 with the same poles opposing to each other. The magnetic fields of 48a and 48b repel each other and the magnetic field of 48a directs toward the adjacent electromagnet 48c while the magnetic field of 48b directs toward the adjacent magnets 48d. Thus, a transfer magnetic field 12 is applied to the surface of the integral piece 15.

FIG. 17(B) is a diagram illustrative of the magnetic field intensity applied to the slave medium in close contact with the magnetic transfer master carrier.

A reduced-strength peak 13 of the strength profile of the magnetic field applied to the slave medium is so much smaller than the optimum transfer magnetic field intensity range that it has no influence at all on pattern transfer from the master carrier to the slave medium. Only a peak 14 of increased strength contributes to magnetic transfer. The peak 14 of increased strength also makes it possible to apply to the slave medium a magnetic field included in the optimum transfer magnetic field intensity range for pattern transfer from the magnetic transfer master carrier to the slave medium, thereby forming a satisfactory pattern irrespective of the configuration of the pattern.

The system used for each of the magnetic transfer methods shown in FIGS. 16 and 17 is provided with a mechanism capable of arbitrarily controlling the distance between the slave medium and the electromagnets and the distance between the juxtaposed one pair of electromagnets. By controlling the distance between the slave medium and the electromagnets and the distance between one pair of electromagnets, it is thus possible to obtain the desired magnetic field intensity on the slave medium surface. The electromagnets used herein may be any one of air-core solenoid coils or coils having iron or other cores at the centers.

Figure 18A:
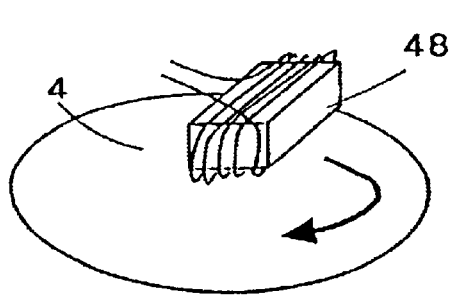
FIGS. 18(A) through 18(E) are illustrative of how to apply a magnetic field using an electromagnet with the axis of a magnetic pole parallel with a slave medium surface.

FIGS. 18(A) through 18(E) are illustrative of how a magnetic field is applied using a single transverse electromagnet. FIG. 18(A) is illustrative of how an electromagnet 48 having a magnetic field symmetrical with respect to its magnetic pole axis is rotated over the upper surface of a slave medium 4 while the magnetic pole axes is positioned parallel with the surface of the slave medium 4.

Figure 18D:
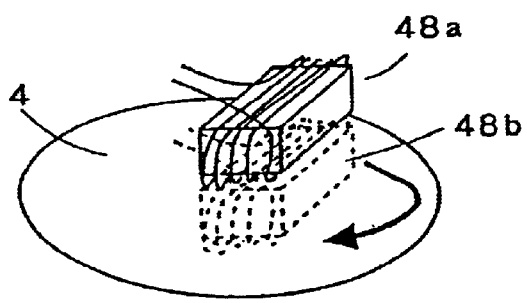
Figure 18B:
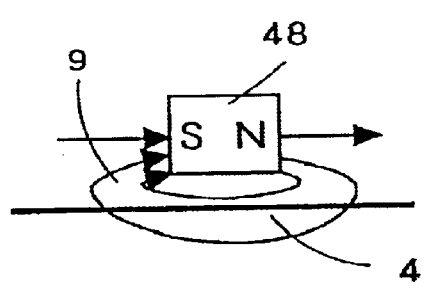

From the single electromagnet 48 positioned over the upper surface of the slave medium 4 a magnetic field 9 is applied to the surface of the slave medium 4, as shown in FIG. 18(B).

Figure 18E:
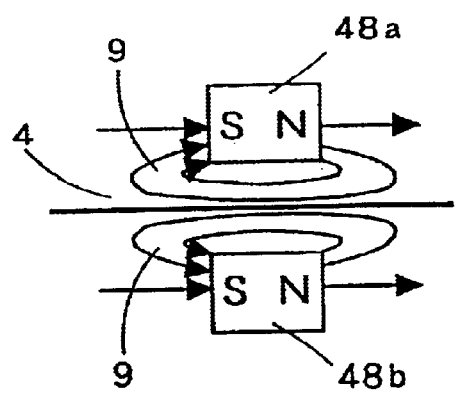
Figure 18C:
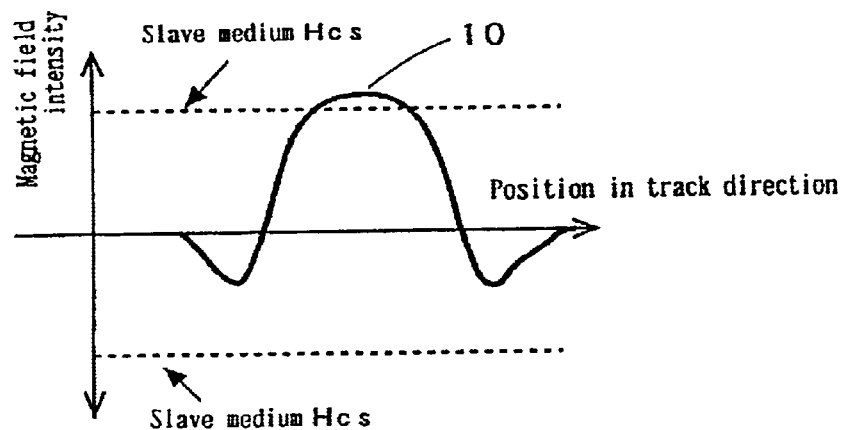

FIG. 18(C) is a diagram illustrative of the strength of the magnetic field applied to the slave medium. The magnetic field applied to the slave medium has a peak 10 exceeding the coercive force Hcs of the slave medium, and so the slave medium can be initially d.c. magnetized by the rotation of the slave medium or the electromagnet.

In the embodiment shown in FIG. 18(D), electromagnets 48a and 48b, each having a magnetic field symmetrical with respect to its magnetic pole axis, are rotated on both surface sides of a slave medium 4 while the magnetic pole axes are located parallel with the surface of the slave medium 4 in the same direction. From the electromagnets 48a and 48b positioned on both surface sides of the slave medium 4, one for each side, magnetic fields 9 are applied to the surfaces of the slave medium 4, as shown in FIG. 18(E).

Figure 19A:
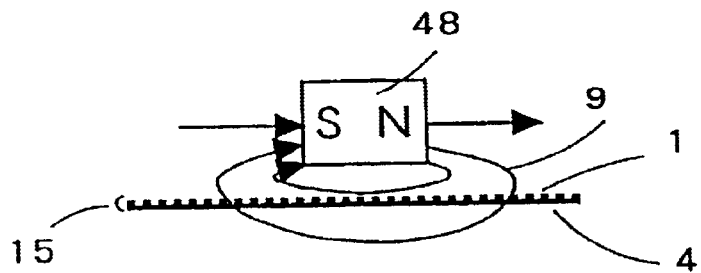
FIGS. 19(A), 19(B) and 19(C) are illustrative of pattern transfer from a master carrier to a slave medium.
Figure 19B:
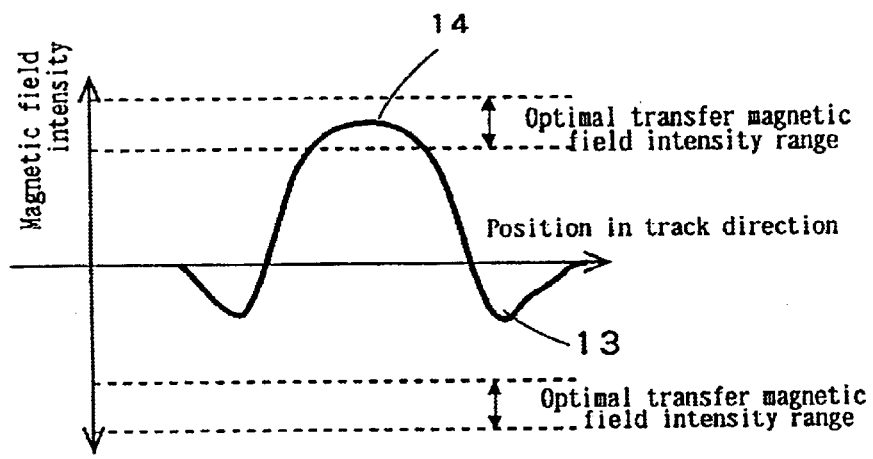
Figure 19C:
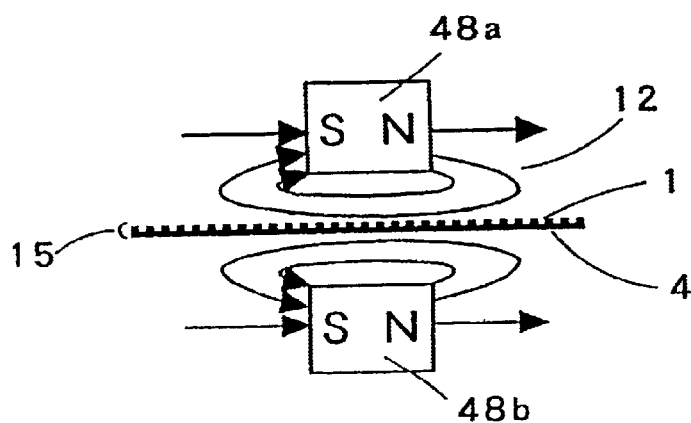

FIGS. 19(A) through 19(C) are illustrative of the transfer method from a magnetic transfer master carrier to a slave medium.

FIG. 19(A) is illustrative of the application of a magnetic field to an integral piece comprising a slave medium and a master carrier in close contact therewith. FIG. 19(B) is a diagram illustrative of the strength of the magnetic field applied as shown in FIG. 19(A).

A single electromagnet 48, which has a magnetic field symmetrical with respect to its magnetic pole axis and produces a magnetic field exceeding the coercive force Hcs of the slave medium in a track direction, is positioned over the surface of an integral piece 15 comprising a slave medium 4 and a master carrier 1 in close contact therewith to apply a magnetic field 9 to the integral piece 15, thereby rotating at least one of the integral piece 15 and the electromagnet 48 in the track direction with respect to the center axis of the integral piece 15, so that a magnetic field can be applied all over the surface of the integral piece 15 in the opposite direction to that of the initial d.c. magnetization.

A reduced-strength peak 13 of the applied magnetic field has no influence on pattern transfer from the magnetic transfer master carrier to the slave medium; that is, only a peak 14 of increased strength contributes to magnetic transfer.

The peak 14 of increased strength also makes it to apply to the integral piece a magnetic field included within the optimum transfer magnetic field intensity range for pattern transfer from the magnetic transfer master carrier to the slave medium, so that a satisfactory pattern can be formed irrespective of the configuration of the pattern to be transferred.

In the embodiment shown in FIG. 19(C), electromagnets 48a and 48b, each having a magnetic field symmetrical with respect to its magnetic pole axis and capable of producing a magnetic field of greater than the coercive force Hcs of the slave medium, are positioned on both surface sides of the integral piece 15 to apply a transfer magnetic field 12 thereto. In this setting, at least one of the integral piece and the electromagnets is rotated in the track direction with respect to the center axis of the integral piece, thereby applying to the whole surface of the integral piece a magnetic field in the opposite direction to that of the initial d.c. magnetization. In this case, the increased-strength peak of the magnetic field has a magnetic transfer action.

The system used to carry out each of the magnetic transfer methods shown in FIGS. 18 and 19 is provided with a mechanism capable of arbitrarily controlling the distance between the slave medium surface and the electromagnet(s) and a mechanism for controlling the energizing current for the electromagnet(s). By controlling the distance between the slave medium and the electromagnet(s) and the energizing current, it is thus possible to obtain the desired magnetic field intensity on the slave medium surface.

The electromagnet(s) used herein may be air-core solenoid coils or coils having iron or other cores at their centers.

Figure 20A:
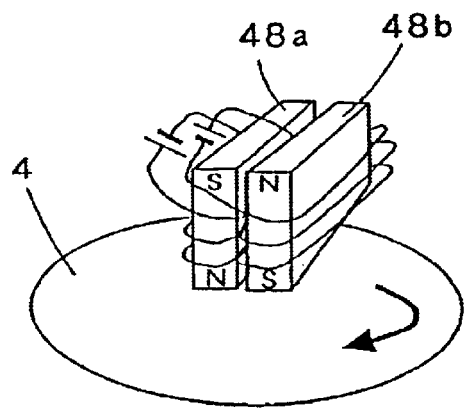
FIGS. 20(A), 20(B) and 20(C) are illustrative of how two juxtaposed electromagnets are used to apply a magnetic field to one surface of a slave medium.
Figure 20B:
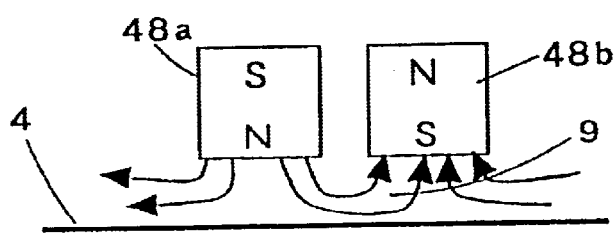
Figure 20C:
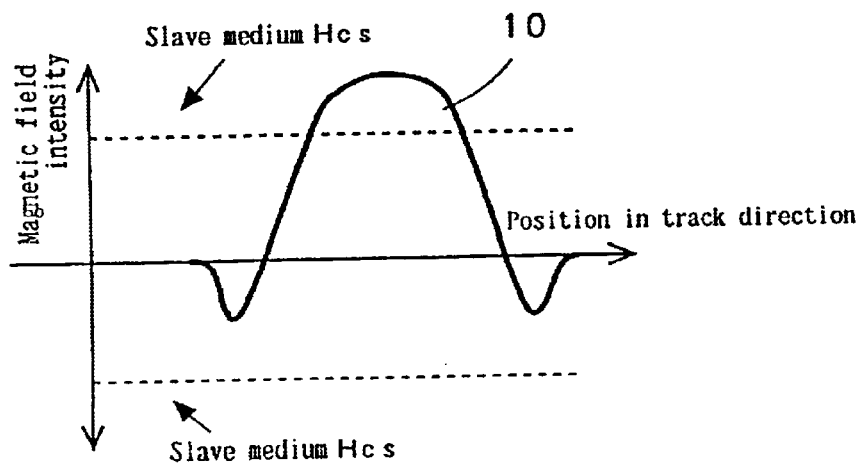

FIGS. 20(A), 20(B) and 20(C) are illustrative of how two electromagnets 48a and 48b are juxtaposed over one surface of a slave medium to apply a magnetic field thereto.

As shown in FIG. 20(A), two electromagnets 48a and 48b are juxtaposed over one surface of a slave medium 4 with their magnet pole axes located vertically to the slave medium in such a way that their magnetic pole directions are opposite to each other, i.e., the polarities of adjacent magnetic poles are opposite to each other. In this setting, the slave medium 4 is rotated.

As explained above, the two electromagnets 48a and 48b are juxtaposed over at least one surface of the slave medium 4 with their magnet pole axes located vertically to the slave medium in such a way that their magnetic pole directions are opposite to each other, i.e., the polarities of adjacent magnetic poles are opposite to each other. As shown in FIG. 20(B), one electromagnet 48a generates a magnetic field directing toward another electromagnet 48b juxtaposed thereto, so that a magnetic field 9 can be applied to the surface of the slave medium 4.

FIG. 20(C) is a diagram illustrative of the strength of the magnetic field applied to the slave medium. The magnetic field applied to the slave medium has a peak 10 exceeding the coercive force Hcs of the slave medium, so that the slave medium can be initially d.c. magnetized by the rotation of slave medium or the two electromagnets.

By use of a similar method, a magnetic field in the opposite direction to that of the initial d.c. magnetization can be applied to a slave medium in close contact with a master carrier to transfer a pattern on the master carrier to the slave medium.

The distance between the juxtaposed electromagnets should preferably be such that they can apply to the slave medium a magnetic field having a strength of greater than the coercive force of the slave medium.

Figure 21A:
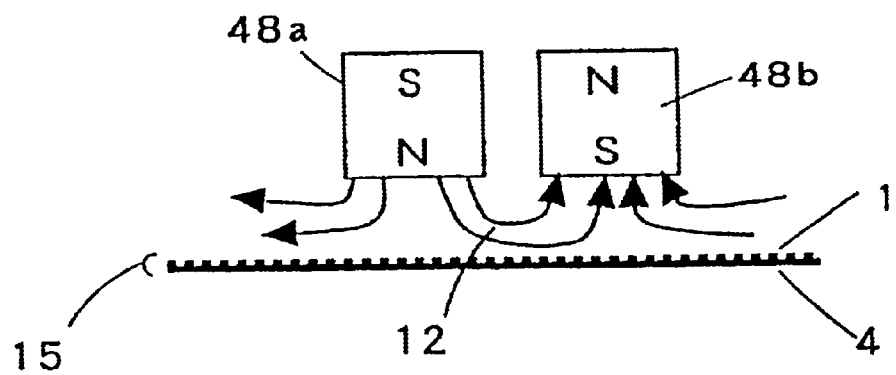
FIGS. 21(A) and 21(B) are illustrative of pattern transfer from a master carrier to a slave medium.
Figure 21B:
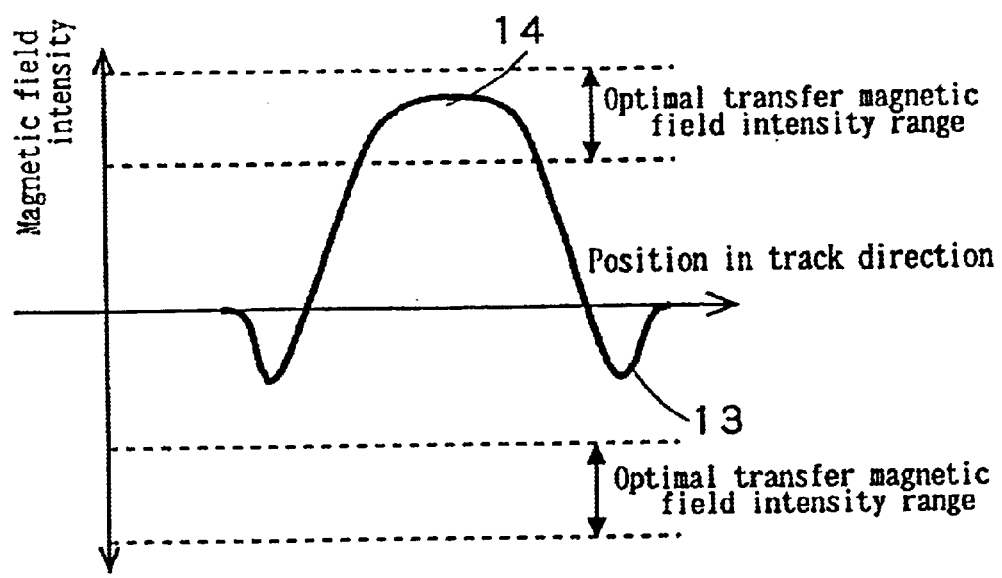

FIGS. 21(A) and 21(B) are illustrative of the transfer method from a magnetic transfer master carrier to a slave medium.

FIG. 21(A) is illustrative of the application of a magnetic field to an integral piece comprising a slave medium and a master carrier in close contact therewith, and FIG. 21(B) is a diagram illustrative of the strength of the magnetic field applied as shown in FIG. 21(A).

Electromagnets 48a and 48b, each having a magnetic field symmetrical with respect to its magnetic pole axis, are juxtaposed over the upper surface of an integral piece 15 comprising a slave medium 4 and a master carrier 1 in close contact therewith in such a way that the polarities of the adjacent magnetic poles are opposite to each other. In this setting, the integral piece 15 is rotated while the magnetic pole axes of the electromagnets are located vertically to the integral piece.

As explained above, the independent electromagnets 48a and 48b are juxtaposed over the upper surface of the integral piece 15 with the polarities of the adjacent magnetic poles opposite to each other. One electromagnet 48a produces a magnetic field directing toward another electromagnet 48b, so that a transfer magnetic field 12 can be applied to the integral piece 15.

FIG. 21(B) is a diagram illustrative of the strength of the magnetic field applied to the slave medium in close contact with the magnetic transfer master carrier.

A reduced-strength peak 13 of the strength profile of the magnetic field applied to the slave medium is so much smaller than the optimum transfer magnetic field intensity range that it has no influence on pattern transfer from the master carrier to the slave medium; that is, only a peak 14 of increased strength contributes to magnetic transfer. The peak 14 of increased strength also makes it possible to apply to the slave medium a magnetic field included in the optimum transfer magnetic field intensity range for pattern transfer from the magnetic transfer master carrier to the slave medium, thereby forming a satisfactory pattern irrespective of the configuration of the pattern.

The system used for each of the magnetic transfer methods shown in FIGS. 20 and 21 is provided with a mechanism capable of arbitrarily controlling the distance between the slave medium and the electromagnets and the distance between the juxtaposed electromagnets. By controlling the distance between the slave medium and the electromagnets and the distance between the juxtaposed electromagnets, it is thus possible to obtain the desired magnetic field intensity on the slave medium surface.

The electromagnets used herein may be any one of air-core solenoid coils or coils having iron or other cores at the centers.

Embodiments of the present invention wherein an annular electromagnet is used as the electromagnet are now explained.

The magnetic recording medium to be servo preformatted is generally a disk form of recording medium in which information is recorded along tracks drawn concentrically from the center of rotation. When a magnetic field is applied to such a disk form of magnetic recording medium for radial pattern transfer, the magnetic field is previously applied to a slave medium surface in its track direction, i.e., at an arbitrary track direction position and in a tangential direction of a circular arc to initially d.c. magnetize the slave medium in the track direction. In this case, an annular electromagnet can be used to generate the desired magnetic field.

Subsequently, the magnetic transfer master carrier is brought in close contact with the initially d.c. magnetized slave medium to apply the transfer magnetic field to a slave medium surface in its track direction for magnetic transfer. It is then required that the direction of initial d.c. magnetization of the slave medium by the previous application of the magnetic field in the track direction be opposite on the slave medium surface to that of the transfer magnetic field applied for magnetic transfer. In this case, the annular electromagnet can be used to generate the desired magnetic field.

In the present invention, the annular electromagnet used for the initial d.c. magnetization and magnetic transfer should preferably have an area that is approximately equal to or larger than the track area. By use of an annular electromagnet having such a size, it is possible to apply a uniform magnetic field to the slave medium or an integral piece comprising a slave medium and a master carrier in close contact therewith.

It is noted that the annular electromagnet used herein is an electromagnet produced by rotating a circle around a center axis to form a torus or other annular member and winding a coil having a size equivalent to the diameter of the circle around the surface of the annular member, so that a major magnetic line of force is formed within the annular member. In the present invention, a magnetic line of force formed on the outside of the annular member is used.

The coil wound around the surface of the annular member may be not only circular but also oval in section. For instance, the coil may have an oblate circular shape or a rectangular shape optionally with circular arcs at both ends. The annular electromagnet should preferably have a flat track surface portion. The distance between the annular electromagnet and the slave medium or the integral piece should preferably be as short as possible or 0.5 mm to 20 mm.

The magnetic field to be applied by the annular electromagnet should have a uniform strength at all track positions or a strength variation of within ±5%, and especially ±2.5% at all track positions.

FIG. 22(A) through 22(D) are illustrative of how a magnetic field is applied using an annular electromagnet.

Figure 22A:
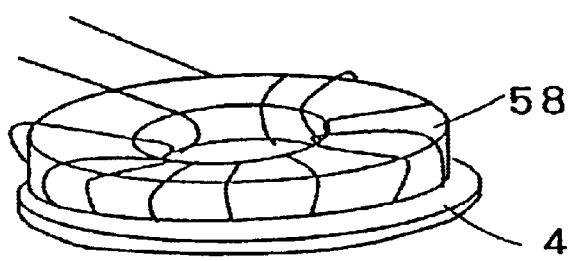
FIGS. 22(A) through 22(D) are illustrative of a magnetic field application method using an annular electromagnet.

As shown in FIG. 22(A), an annular electromagnet 58 is positioned over the upper surface of a slave medium 4 to initially d.c. magnetize the slave medium 4.

Figure 22B:
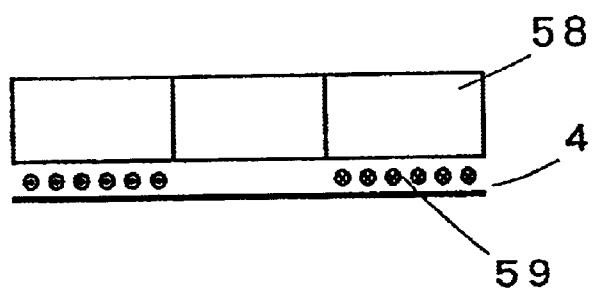

From the annular electromagnet 58 positioned over the upper surface of the slave medium 4, a magnetic field 59 leaking from the annular electromagnet is applied to the surface of the slave medium 4, as shown in FIG. 22(B), so that the slave medium can be initially d.c. magnetized.

Figure 22C:
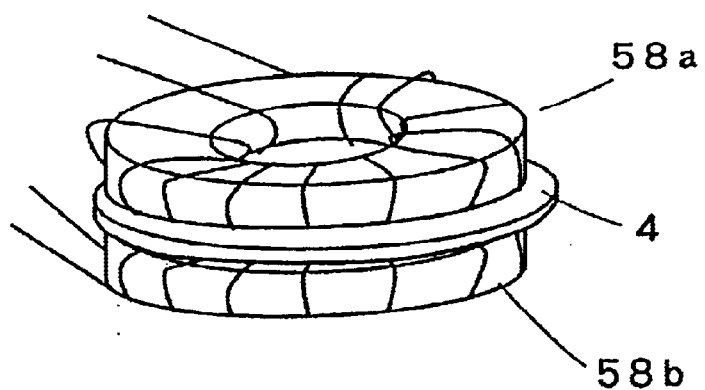
Figure 22D:
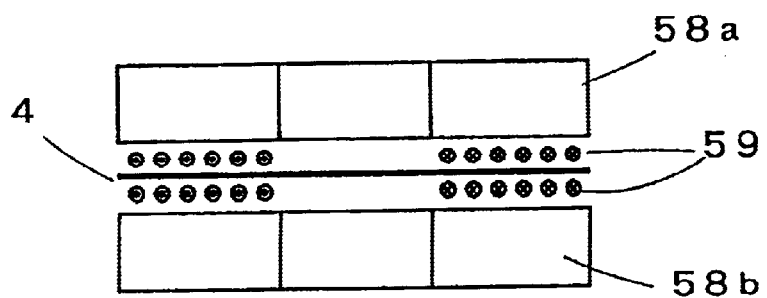

In the embodiment shown in FIG. 22(C), annular electromagnets 58a and 58b are positioned on the upper and lower surface sides of a slave medium 4. From the annular electromagnets 58a and 58b positioned on both surface sides of the slave medium 4, one for each side, a magnetic filed 59 is applied to the surfaces of the slave medium 4, as shown in FIG. 22(D).

The strength of the magnetic field applied from the annular electromagnet to the slave medium surface may be controlled by changing the strength of the current fed to the annular electromagnet and the spacing between the annular electromagnet and the slave medium surface.

Figure 23:
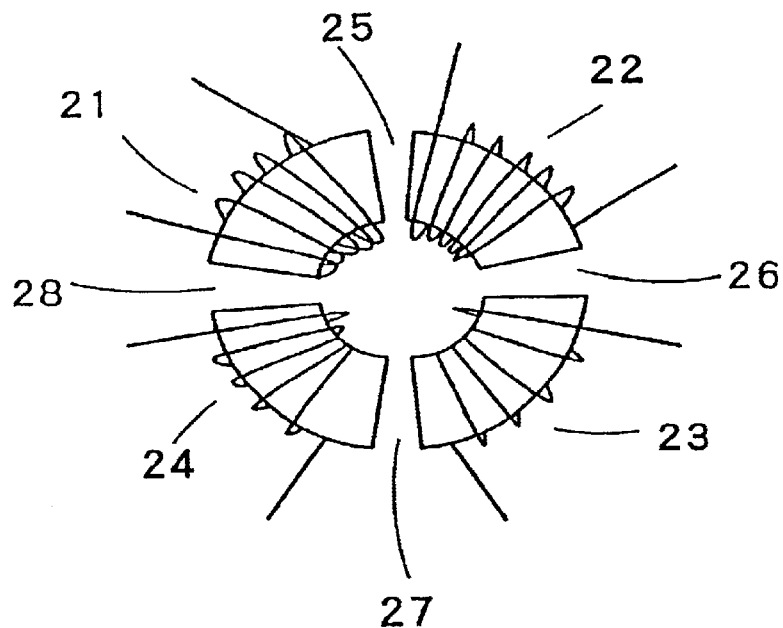
FIG. 23 is illustrative of another annular electromagnet.

FIG. 23 is illustrative of another embodiment of the annular electromagnet.

The annular electromagnet shown in FIG. 23 is built up of four distinct coils 21 through 24. By controlling the current fed to each coil 21 to 24 and regulating the space 25 to 28 between adjacent coils, it is possible to control the strength of the magnetic field applied to a slave medium surface.

Figure 24A:
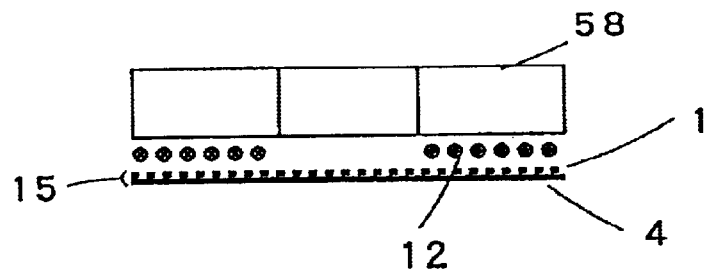
FIGS. 24(A) and 24(B) are illustrative of pattern transfer from a master carrier to a slave medium.
Figure 24B:
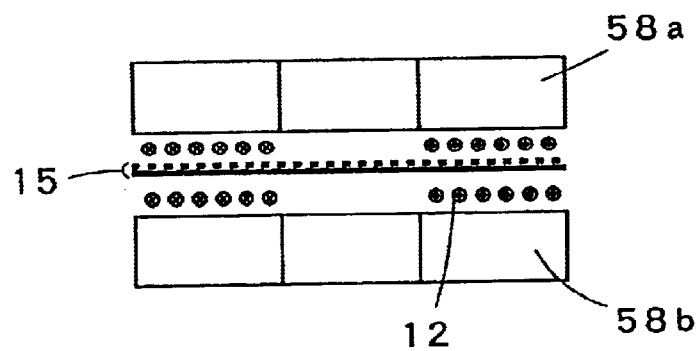

FIGS. 24(A) and 24(B) are illustrative of the transfer method from a magnetic transfer master carrier to a slave medium as well as of the application of a magnetic field to r an integral piece comprising a slave medium and a master carrier in close contact therewith.

As shown, an annular electromagnet 58 is positioned over the surface of an integral piece 15 comprising a slave medium 4 and a master carrier 1 in close contact therewith to apply a magnetic field 12 thereto, so that a magnetic field can be applied to the whole surface of the integral piece 15 in the opposite direction to that of initial d.c. magnetization.

The system used to carry out each of the magnetic transfer methods shown in FIGS. 22 to 24 is provided with a mechanism capable of arbitrarily controlling the distance between the slave medium surface and the annular electromagnet and a mechanism for controlling the energizing current for the electromagnet. By controlling the distance between the slave medium and the annular electromagnet and the energizing current, it is thus possible to obtain the desired magnetic field intensity on the slave medium surface.

The annular electromagnet used herein may be an air-core solenoid coil or a coil having an iron or other core at its center.

How to fabricate the magnetic transfer master carrier used in the present invention is now explained.

For the substrate for the magnetic transfer master carrier, use may be made of a sheet substrate with a smooth surface, which is formed of silicon, quartz, glass, non-magnetic metals such as aluminum or their alloy, ceramics, and synthetic resins. The substrate must be resistant to treating temperature or other environments encountered at etching and film-formation process steps.

A photoresist is coated on the substrate with a smooth surface. Using a photomask corresponding to the desired preformatting pattern, the photoresist is exposed to light and developed to form a pattern corresponding to information on the photoresist. Alternatively, the pattern may be drawn directly on the photoresist.

Then, at the etching step the substrate is etched correspondingly to the pattern by means of any one of reactive etching, physical etching using an argon plasma, and liquid etching which may be selected depending on the substrate used.

The depths of pits formed by etching should be correspondingly to the thickness of a magnetic layer formed as a transfer information recording portion. However, it is preferable that 20 nm≦pit depth≦1,000 nm. Too large a pit depth is not preferable because the magnetic field breadth becomes large.

It is preferable to form pits of uniform depth so that the bottom surfaces of the pits can be formed of planes parallel with the surface of the substrate.

The pits should preferably have a rectangular shape in the track direction section vertical to the plane.

Then, a film form of magnetic material is formed to the surface of the substrate with a thickness corresponding to the formed pits, using vacuum film deposition means such as vacuum evaporation, sputtering and ion plating or plating means. Referring here to the magnetic characteristics of the transfer information recording portion, the coercivity (Ha) is 2,500 Oe or less and preferably 5 to 1,500 Oe, and the saturated flux density (Bs) is 0.3 T (tesla) or more and preferably 0.5 T or more.

Then, the photoresist is removed by a lift-off process, and the substrate is polished on the surface for removal of burrs, if any, followed by surface flattening.

The fabrication process wherein pits are first formed in the substrate and a film form of magnetic material is then formed in the pits has been explained. However, it is acceptable to use a photo-fabrication process wherein a film form of magnetic material is first formed at a given portion on a substrate to form a projection portion as a transfer information recording portion, and a non-magnetic material is then formed or filled between projections to make the transfer information recording portion flush with the non-magnetic material portion.

For the magnetic layer, magnetic materials having high magnetic flux densities such as cobalt, iron or their alloys may be used. For instance, Co, CoPtCr, CoCr, CoPtCrTa, CoPtCrNbTa, CoCrB, CoNi, Fe, FeCo and FePt may be used.

The magnetic layer should have a thickness of 20 to 1,000 nm, and preferably 30 to 500 nm. Too thick a magnetic layer becomes poor in record resolving power.

In consideration of clear transfer, particular preference is given to a magnetic material that has a high magnetic flux density and is of magnetic anisotropy in the same direction as the slave medium, for instance, in the longitudinal direction in the case of longitudinal recording and in the vertical direction in the case of vertical recording. The magnetic material should also preferably a fine magnetic particle or amorphous structure because sharp edges can then be formed.

To impart magnetic anisotropy to the magnetic material, it is preferable to provide a non-magnetic primer layer. In this case, the non-magnetic primer layer is required to have the same crystallographic structure and lattice constant as those of the magnetic layer. Exemplary primer layers may be formed by the sputtering of Cr, CrTi, CoCr, CrTa, CrMo, NiAl, Ru, etc.

It is also preferable to provide a protective film such as a diamond-like carbon film and a lubricating agent on the magnetic layer. More preferably, a diamond-like carbon film of 5 to 30 nm and a lubricating film are present in the form of protective films, on which a lubricating agent should be provided for the reason that in the absence of the lubricating agent, durability becomes insufficient due to friction caused by correction of a possible misalignment of the slave medium with the master carrier.

The magnetic transfer master carrier according to the present invention can be used not only for transfer of magnetic recording information to a disk type of magnetic recording media such as hard disks and removal type magnetic recording media but also for transfer of magnetic recording information to a card type of magnetic recording media and a tape type of magnetic recording media.

EXAMPLE

The present invention is now explained with reference to a number of examples.

Example 1-1 and Comparative Example 1-1

Preparation of Master Carrier

A vacuum film deposition system was evacuated at room temperature to $10^{-7}$ Torr, and argon was then introduced in the system until the condition of 3×10⁻³ Torr was obtained. Under this condition, an FeCo film of 200 nm in thickness was formed on a silicon substrate to prepare a magnetic transfer master carrier.

The master carrier was found to have a coercive force Hc of 100 Oe and a magnetic flux density Ms of 23,000 gausses.

The master carrier was then provided thereon with a disk-like pattern comprising 10 $\mu$ wide radial lines at regular intervals and a 20 mm to 40 mm position in the radial direction from the center of the disk, with a line interval of 10 $\mu$m at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of 3×10⁻³ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Magnetic Transfer Testing

The initial d.c. magnetization of the slave medium was carried out while a permanent magnet was located as shown in FIG. 2, so that a peak magnetic strength of 5,000 Oe that was twice that coercive force Hc of the slave medium was obtained on the surface of the slave medium.

Then, the initially d.c. magnetized slave medium and the magnetic transfer master carrier were brought into close contact with each other. Using the system having an inclined permanent magnet as shown in FIG. 4, a magnetic field was applied in the opposite direction to the direction of magnetization for magnetic transfer. The angle of inclination θ of the permanent magnet with respect to the slave medium was 35° in FIG. 4. To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an MR head having a read head gap of 0.24 $\mu$m, a read track width of 1.9 $\mu$m, a write head gap of 0.4 $\mu$m and a write track width of 2.4 $\mu$m.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 1-1. It is noted that the asterisk mark indicates a C/N value of −20 dB or lower or that the quality of the magnetically transferred signals is far from the practical level.

TABLE 1-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −16.3 |
| 1,500 | 0.6 | −3.2 |
| 2,000 | 0.8 | −0.6 |
| 2,250 | 0.9 | −0.3 |
| 2,500 | 1.0 | −0.1 |
| 2,750 | 1.1 | 0.0 |
| 3,000 | 1.2 | −3.5 |
| 3,250 | 1.3 | −3.8 |
| 3,500 | 1.4 | −10.2 |
| 3,750 | 1.5 | −16.9 |
| 4,000 | 1.6 | * |
| 5,000 | 2.0 | * |

Example 1-2 and Comparative Example 1-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 1-1, and electromagnetic performance was estimated as in Example 1-1. The results are shown in Table 1-2.

TABLE 1-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −13.6 |
| 1,500 | 0.6 | −2.9 |
| 2,000 | 0.8 | −2.1 |
| 2,250 | 0.9 | −0.8 |
| 2,500 | 1.0 | 0.0 |
| 2,750 | 1.1 | −0.3 |
| 3,000 | 1.2 | −1.4 |
| 3,250 | 1.3 | −2.4 |
| 3,500 | 1.4 | −10.2 |
| 3,750 | 1.5 | −19.6 |
| 4,000 | 1.6 | * |
| 5,000 | 2.0 | * |

Comparative Example 1-3

The initial d.c. magnetization of a slave medium having a coercive force Hcs of 2,500 Oe prepared as in Example 1-1 was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 1-1 with the exception that the system shown in FIG. 4 was used, and electromagnetic performance was estimated as in Example 1-1. The results are shown in Table 1-3.

TABLE 1-3

Hcs of Slave Medium: 2,500 Oe

| Peak Strength Oe of Transfer Magnetic Field | Ratio to Hcs | ΔC/N (dB) |
| --- | --- | --- |
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 1-3 and Comparative Example 1-4

The initial d.c. magnetization of a slave medium having a coercive force Hcs of 2,500 Oe was carried out at peak magnetic field intensitys of 5,000 Oe, 3,000 Oe and 2,000 Oe, using the permanent magnet shown in FIG. 3. Then, the initially d.c. magnetized slave medium and a magnetic transfer master carrier were brought into close contact with each other for magnetic transfer. Using the permanent magnet shown in FIG. 4, a magnetic field was applied for magnetic transfer.

The results were much the same as those obtained using the system having the permanent magnet shown in FIG. 2. Example 1-4 and Comparative Example 1-5

The initial d.c. magnetization of a slave medium having a coercive force Hcs of 2,000 Oe prepared as in Example 1-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer using the system shown in FIG. 4. Otherwise, the magnetic transfer was carried out as in Example 1-1, and electromagnetic performance was estimated as in Example 1-1. The results are shown in Table 1-4.

TABLE 1-4

Hcs of Slave Medium: 2,000 Oe

| Peak Strength Oe of Transfer Magnetic Field | Ratio to Hcs | ΔC/N (dB) |
| --- | --- | --- |
| 600 | 0.3 | * |
| 1,000 | 0.5 | −18.2 |
| 1,200 | 0.6 | −4.8 |
| 1,600 | 0.8 | −3.2 |
| 1,800 | 0.9 | −0.1 |
| 2,000 | 1.0 | 0.0 |
| 2,200 | 1.1 | −0.2 |
| 2,400 | 1.2 | −0.8 |
| 2,600 | 1.3 | −2.3 |
| 2,800 | 1.4 | −9.6 |
| 3,000 | 1.5 | −16.3 |
| 3,200 | 1.6 | * |
| 4,000 | 2.0 | * |

Example 1-5 and Comparative Example 1-6

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 1-1 to obtain a magnetic transfer pattern, and electromagnetic performance was estimated as in Example 1-1. The results are shown in Table 1-5.

TABLE 1-5

Hcs of Slave Medium: 2,000 Oe

| Peak Strength Oe of Transfer Magnetic Field | Ratio to Hcs | ΔC/N (dB) |
| --- | --- | --- |
| 600 | 0.3 | * |
| 1,000 | 0.5 | −17.2 |
| 1,200 | 0.6 | −4.2 |
| 1,600 | 0.8 | −2.1 |
| 1,800 | 0.9 | −0.7 |
| 2,000 | 1.0 | 0.0 |
| 2,200 | 1.1 | 0.0 |
| 2,400 | 1.2 | −0.6 |
| 2,600 | 1.3 | −4.2 |
| 2,800 | 1.4 | −13.2 |
| 3,000 | 1.5 | −19.8 |
| 3,200 | 1.6 | * |
| 4,000 | 2.0 | * |

Example 1-6 and Comparative Example 1-7

The initial d.c. magnetization of a slave medium having a coercive force Hcs of 2,000 Oe was carried out at peak magnetic field intensitys of 4,000 Oe, 2,400 Oe and 1,600 Oe, using the permanent magnet shown in FIG. 3. Then, the initially d.c. magnetized slave medium and a magnetic transfer master carrier were brought into close contact with each other for magnetic transfer. Using the permanent magnet shown in FIG. 4, a magnetic field was applied for magnetic transfer. The results were much the same as those obtained using the system having the permanent magnet shown in FIG. 2. Comparative Example 1-8

The initial d.c. magnetization of a slave medium having a coercive force Hcs of 2,000 Oe prepared as in Example 1-1 was carried out at a peak magnetic field intensity of 1,600 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 1-1 with the exception that the system shown in FIG. 4 was used, and electromagnetic performance was estimated as in Example 1-1. The results are shown in Table 1-6.

TABLE 1-6

Hcs of Slave Medium: 2,000 Oe

| Peak Strength Oe of Transfer Magnetic Field | Ratio to Hcs | ΔC/N (dB) |
| --- | --- | --- |
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |

TABLE 1-6-continued

Hcs of Slave Medium: 2,000 Oe

| Peak Strength Oe of Transfer Magnetic Field | Ratio to Hcs | ΔC/N (dB) |
|---|---|---|
| 2,600 | 1.3 | * |
| 2,800 | 1.4 | * |
| 3,000 | 1.5 | * |
| 3,200 | 1.6 | * |
| 4,000 | 2.0 | * |

According to the above magnetic transfer from the magnetic transfer master carrier to the slave medium, the transfer magnetic field having a specific strength is applied to the coercive force Hcs of the slave medium, thereby imparting a high-quality transfer pattern to the slave medium irrespective of the position and configuration of the pattern. Example 2-1 and Comparative Example 2-1

Preparation of Master Carrier

A vacuum film deposition system was evacuated at room temperature to $10^{-7}$ Torr, and argon was then introduced in the system until the condition of $3\times10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising 10 μ wide radial lines at regular intervals and a 20 mm to 40 mm position in the radial direction from the center of the disk, with a line interval of 10 μm at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3\times10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out by locating such a permanent magnet as shown in FIG. 5 such that a peak magnetic field intensity of 5,000 Oe that was twice as high as the coercive force Hcs of the slave medium was obtained on the surface of the slave medium.

Magnetic Transfer Testing

The initially d.c. magnetized slave medium and the magnetic transfer master carrier were brought into close contact with each other. Using the system having an inclined permanent magnet as shown in FIG. 6, a magnetic field was applied in the opposite direction to the direction of magnetization for magnetic transfer. To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an MR head having a read head gap of 0.27 μm, a read track width of 2.4 μm, a write head gap of 0.4 μm and a write track width of 3.1 μm.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 2-1. It is noted that the asterisk mark indicates a C/N value of −20 dB or lower or that the quality of the magnetically transferred signals is far from the practical level.

TABLE 2-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −10.3 |
| 1,500 | 0.6 | −4.8 |
| 2,000 | 0.8 | −1.2 |
| 2,250 | 0.9 | −0.4 |
| 2,500 | 1.0 | 0.0 |
| 2,750 | 1.1 | −0.2 |
| 3,000 | 1.2 | −1.2 |
| 3,250 | 1.3 | −3.5 |
| 3,500 | 1.4 | −6.3 |
| 3,750 | 1.5 | −11.0 |
| 4,000 | 1.6 | * |
| 5,000 | 2.0 | * |

Example 2-2 and Comparative Example 2-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 2-1, and electromagnetic performance was estimated as in Example 2-1. The results are shown in Table 2-2. The peak strength of the transfer magnetic field shows a peak of the magnetic field profile shown in FIG. 6(C).

TABLE 2-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −9.2 |
| 1,500 | 0.6 | −2.6 |
| 2,000 | 0.8 | −2.5 |
| 2,250 | 0.9 | −0.5 |
| 2,500 | 1.0 | 0.0 |
| 2,750 | 1.1 | −0.2 |
| 3,000 | 1.2 | −1.3 |
| 3,250 | 1.3 | −2.5 |
| 3,500 | 1.4 | −5.7 |
| 3,750 | 1.5 | −12.9 |
| 4,000 | 1.6 | * |
| 5,000 | 2.0 | * |

Comparative Example 2-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 2-1, and electromagnetic performance was estimated as in Example 2-1. The results are shown in Table 2-3. The peak strength of the transfer magnetic field shows a peak of the magnetic field profile shown in FIG. 6(C).

TABLE 2-3

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 2-3 and Comparative Example 2-4

The initial d.c. magnetization of a slave medium having a coercive force Hcs of 2,000 Oe prepared as in Example 2-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer. The magnetic transfer was carried out as in Example 2-1 with the exception that the system shown in FIG. 6 was used, and electromagnetic performance was estimated as in Example 2-1. The results are shown in Table 2-4. The peak strength of the transfer magnetic field shows a peak of the magnetic field profile shown in FIG. 6(C).

TABLE 2-4

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −12.3 |
| 1,200 | 0.6 | −2.8 |
| 1,600 | 0.8 | −1.2 |
| 1,800 | 0.9 | −0.5 |
| 2,000 | 1.0 | −0.2 |
| 2,200 | 1.1 | 0.0 |
| 2,400 | 1.2 | −1.1 |
| 2,600 | 1.3 | −3.2 |
| 2,800 | 1.4 | −6.5 |
| 3,000 | 1.5 | −16.3 |
| 3,200 | 1.6 | * |
| 4,000 | 2.0 | * |

Example 2-4 and Comparative Example 2-5

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 2-1, and electromagnetic performance was estimated as in Example 2-1. The results are shown in Table 2-5. The peak strength of the transfer magnetic field shows a peak of the magnetic field profile shown in FIG. 6(C).

TABLE 2-5

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −12.9 |
| 1,200 | 0.6 | −2.6 |
| 1,600 | 0.8 | −1.2 |
| 1,800 | 0.9 | −0.2 |
| 2,000 | 1.0 | 0.0 |
| 2,200 | 1.1 | −0.1 |
| 2,400 | 1.2 | −1.2 |
| 2,600 | 1.3 | −2.6 |
| 2,800 | 1.4 | −6.3 |
| 3,000 | 1.5 | −10.9 |
| 3,200 | 1.6 | * |
| 4,000 | 2.0 | * |

Comparative Example 2-6

The initial d.c. magnetization of a slave medium having a coercive force Hcs of 2,000 Oe prepared as in Example 2-1 was carried out at a peak magnetic field intensity of 1,600 Oe that was four-fifths of the coercive force Has of the slave medium. Then, the initially d.c. magnetized slave medium and a magnetic transfer master carrier were brought into close contact with each other for magnetic transfer. The magnetic transfer was carried out as in Example 2-1 with the exception that the system shown in FIG. 6 was used, and electromagnetic performance was estimated as in Example 2-1. The results are shown in Table 2-6. The peak strength of the transfer magnetic field shows a peak of the magnetic field profile shown in FIG. 6(C).

TABLE 2-6

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

Example 3-1 and Comparative Example 3-1

Preparation of Master Carrier

A vacuum film deposition system was evacuated at room temperature to $10^{-7}$ Torr, and argon was then introduced in the system until the condition of $3\times10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising 10 µ wide radial lines at regular intervals and a 20 mm to 40 mm position in the radial direction from the center of the disk, with a line interval of 10 µm at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3\times10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out by locating such a permanent magnet as shown in FIG. 7 such that a peak magnetic field intensity of 5,000 Oe that was twice as high as the coercive force Hcs of the slave medium was obtained on the surface of the slave medium.

Magnetic Transfer Testing

The initially d.c. magnetized slave medium and the magnetic transfer master carrier were brought into close contact with each other. Using the system having the permanent magnet shown in FIG. 9, a magnetic field was applied in the opposite direction to the direction of magnetization for magnetic transfer. To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an MR head having a read head gap of 0.31 µm, a read track width of 1.8 µm, a write head gap of 0.4 µm and a write track width of 3.0 µm.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 3-1. It is noted that the asterisk mark indicates a C/N value of −20 dB or lower or that the quality of the magnetically transferred signals is far from the practical level.

TABLE 3-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −15.8 |
| 1,500 | 0.6 | −5.2 |
| 2,000 | 0.8 | −1.9 |
| 2,250 | 0.9 | −1.2 |
| 2,500 | 1.0 | 0.0 |
| 2,750 | 1.1 | −0.3 |
| 3,000 | 1.2 | −3.5 |
| 3,250 | 1.3 | −3.5 |
| 3,500 | 1.4 | −4.9 |
| 3,750 | 1.5 | −8.6 |
| 4,000 | 1.6 | −16.3 |
| 5,000 | 2.0 | * |

Example 3-2 and Comparative Example 3-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 3-1, and electromagnetic performance was estimated as in Example 3-1. The results are shown in Table 3-2. The peak strength of the transfer magnetic field shows a peak of the magnetic field profile shown in FIG. 9(B).

TABLE 3-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −12.8 |
| 1,500 | 0.6 | −3.1 |
| 2,000 | 0.8 | −0.2 |
| 2,250 | 0.9 | 0.0 |
| 2,500 | 1.0 | −0.2 |
| 2,750 | 1.1 | −0.3 |
| 3,000 | 1.2 | −2.9 |
| 3,250 | 1.3 | −3.5 |
| 3,500 | 1.4 | −6.8 |
| 3,750 | 1.5 | −19.2 |
| 4,000 | 1.6 | * |
| 5,000 | 2.0 | * |

Comparative Example 3-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 3-1, and electromagnetic performance was estimated as in Example 3-1. The results are shown in Table 3-3. The peak strength of the transfer magnetic field shows a peak of the magnetic field profile shown in FIG. 9(B).

TABLE 3-3

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 3-3 and Comparative Example 3-4

The initial d.c. magnetization of a slave medium having a coercive force Hcs of 2,000 Oe prepared as in Example 3-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer. The magnetic transfer was carried out as in Example 3-1 with the exception that the system shown in FIG. 8 was used, and electromagnetic performance was estimated as in Example 3-1. The results are shown in Table 3-4. The peak strength of the transfer magnetic field shows a peak of the magnetic field profile shown in FIG. 9(B).

TABLE 3-4

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −10.2 |
| 1,200 | 0.6 | −2.3 |
| 1,600 | 0.8 | −0.9 |
| 1,800 | 0.9 | −0.2 |
| 2,000 | 1.0 | 0.0 |
| 2,200 | 1.1 | −0.9 |
| 2,400 | 1.2 | −1.1 |
| 2,600 | 1.3 | −3.1 |
| 2,800 | 1.4 | −9.6 |
| 3,000 | 1.5 | −16.5 |
| 3,200 | 1.6 | * |
| 4,000 | 2.0 | * |

Example 3-4 and Comparative Example 3-5

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 3-1, and electromagnetic performance was estimated as in Example 3-1. The results are shown in Table 3-5. The peak strength of the transfer magnetic field shows a peak of the magnetic field profile shown in FIG. 9(B).

TABLE 3-5

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −12.4 |
| 1,200 | 0.6 | −4.3 |
| 1,600 | 0.8 | −0.9 |
| 1,800 | 0.9 | −0.1 |
| 2,000 | 1.0 | 0.0 |
| 2,200 | 1.1 | 0.0 |
| 2,400 | 1.2 | −1.3 |
| 2,600 | 1.3 | −9.2 |
| 2,800 | 1.4 | −19.6 |
| 3,000 | 1.5 | * |
| 3,200 | 1.6 | * |
| 4,000 | 2.0 | * |

Comparative Example 3-6

The initial d.c. magnetization of a slave medium having a coercive force Hcs of 2,000 Oe prepared as in Example 3-1 was carried out at a peak magnetic field intensity of 1,600 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 3-1, and electromagnetic performance was estimated as in Example 3-1. The results are shown in Table 3-6. The peak strength of the transfer magnetic field shows a peak of the magnetic field profile shown in FIG. 9(B).

TABLE 3-6

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

Example 4-1

Preparation of Master Carrier

A vacuum film deposition system was evacuated at room temperature to $10^{-7}$ Torr, and argon was then introduced in the system until the condition of $3 \times 10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising 10 μ wide radial lines at regular intervals and a 20 mm to 40 mm position in the radial direction from the center of the disk, with a line interval of 10 μm at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3 \times 10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out by locating an electromagnet as shown in FIG. 10 such that a peak magnetic field intensity of 5,000 Oe that was twice as high as the coercive force Hcs of the slave medium was obtained on the surface of the slave medium.

Magnetic Transfer Testing

The initially d.c. magnetized slave medium and the magnetic transfer master carrier were brought into close contact with each other. Using the system having the electromagnet shown in FIG. 12, a magnetic field was applied in the opposite direction to the direction of magnetization for magnetic transfer. In FIG. 12, the angle of inclination 0 of the electromagnet with respet to the slave medium was 35°. To bring the slave medium and the magnetic transfer master carrier in close contact with each other, pressure was applied from above an aluminum plate having a rubber plate provided on its lower side. The peak strength of the transfer magnetic field showed a peak of the magnetic field intensity shown in FIG. 12(B).

Estimation of Electromagnetic Performance

Signals transferred to the slave medium were estimated using an electromagnetic performance measuring device (SS-60 made by Kyodo Denshi Co., Ltd.). For the head, use was made of an MR head having a read head gap of 0.26 μm, a read track width of 2.2 μm, a write head gap of 0.4 μm and a write track width of 2.8 μm.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 4-1. It is noted that the asterisk mark indicates a C/N value of –20 dB or lower or that the quality of the magnetically transferred signals is far from the practical level.

TABLE 4-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | –13.5 |
| 1,500 | 0.6 | –3.5 |

TABLE 4-1-continued

Hcs of Slave Medium: 2,500 Oe

| Peak Strength Oe of Transfer Magnetic Field | Ratio to Hcs | ΔC/N (dB) |
|---|---|---|
| 2,000 | 0.8 | –2.3 |
| 2,250 | 0.9 | –1.5 |
| 2,500 | 1.0 | 0.0 |
| 2,750 | 1.1 | –0.7 |
| 3,000 | 1.2 | –4.3 |
| 3,250 | 1.3 | –5.8 |
| 3,500 | 1.4 | –8.6 |
| 3,750 | 1.5 | –10.5 |
| 4,000 | 1.6 | * |
| 5,000 | 2.0 | * |

Example 4-2 and Comparative Example 4-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 4-1, and electromagnetic performance was estimated as in Example 4-1. The results are shown in Table 4-2. The peak strength of the transfer magnetic field shows a peak of the magnetic field profile shown in FIG. 12(B).

TABLE 4-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | –11.3 |
| 1,500 | 0.6 | –5.5 |
| 2,000 | 0.8 | –0.9 |
| 2,250 | 0.9 | 0.0 |
| 2,500 | 1.0 | 0.0 |
| 2,750 | 1.1 | –0.7 |
| 3,000 | 1.2 | –1.8 |
| 3,250 | 1.3 | –3.4 |
| 3,500 | 1.4 | –5.3 |
| 3,750 | 1.5 | –9.6 |
| 4,000 | 1.6 | * |
| 5,000 | 2.0 | * |

Comparative Example 4-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 4-1, and electromagnetic performance was estimated as in Example 4-1. The results are shown in Table 4-3. The peak strength of the transfer magnetic field shows a peak of the magnetic field profile shown in FIG. 12(B).

TABLE 4-3

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 4-3 and Comparative Example 4-4

The initial d.c. magnetization of a slave medium having a coercive force Hcs of 2,000 Oe prepared as in Example 4-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer. The magnetic transfer was carried out as in Example 4-1 with the exception that the system shown in FIG. 11 was used, and electromagnetic performance was estimated as in Example 4-1. The results are shown in Table 4-4. The peak strength of the transfer magnetic field shows a peak of the magnetic field profile shown in FIG. 12(B).

TABLE 4-4

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −14.2 |
| 1,200 | 0.6 | −5.3 |
| 1,600 | 0.8 | −1.9 |
| 1,800 | 0.9 | −0.1 |
| 2,000 | 1.0 | 0.0 |
| 2,200 | 1.1 | −1.3 |
| 2,400 | 1.2 | −1.7 |
| 2,600 | 1.3 | −2.3 |
| 2,800 | 1.4 | −6.2 |
| 3,000 | 1.5 | −10.2 |
| 3,200 | 1.6 | * |
| 4,000 | 2.0 | * |

Example 4-4 and Comparative Example 4-5

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 4-1, and electromagnetic performance was estimated as in Example 4-1. The results are shown in Table 4-5. The peak strength of the transfer magnetic field shows a peak of the magnetic field profile shown in FIG. 12(B).

TABLE 4-5

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −16.9 |
| 1,200 | 0.6 | −3.6 |
| 1,600 | 0.8 | −1.3 |
| 1,800 | 0.9 | 0.0 |
| 2,000 | 1.0 | 0.0 |
| 2,200 | 1.1 | −0.5 |
| 2,400 | 1.2 | −2.1 |
| 2,600 | 1.3 | −3.8 |
| 2,800 | 1.4 | −9.3 |
| 3,000 | 1.5 | −18.2 |
| 3,200 | 1.6 | * |
| 4,000 | 2.0 | * |

Comparative Example 4-6

The initial d.c. magnetization of a slave medium having a coercive force Hcs of 2,000 Oe prepared as in Example 4-1 was carried out at a peak magnetic field intensity of 1,600 Oe that was four-fifths of the coercive force Hcs of the slave medium. Then, the initially d.c. magnetized'slave medium and a magnetic transfer master carrier were brought into close contact with each other for magnetic transfer. The magnetic transfer was carried out as in Example 4-1 with the exception that the system shown in FIG. 11 was used, and electromagnetic performance was estimated as in Example 4-1. The results are shown in Table 4-6. The peak strength of the transfer magnetic field shows a peak of the magnetic field profile shown in FIG. 12(B).

TABLE 4-6

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

Example 5-1 and Comparative Example 5-1

Preparation of Master Carrier

A vacuum film deposition system was evacuated at room temperature to $10^{-7}$ Torr, and argon was then introduced in the system until the condition of $3 \times 10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising 10 μ wide radial lines at regular intervals and a 20 mm to 40 mm position in the radial direction from the center of the disk, with a line interval of 10 μm at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3\times10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out by locating electromagnets as shown in FIG. 13(A) while they were inclined as shown in FIG. 14 such that a peak magnetic field intensity of 5,000 Oe that was twice as high as the coercive force Hcs of the slave medium was obtained on the surface of the slave medium. The angle of the electromagnet with respect to the surface of the slave medium was 30°.

Magnetic Transfer Testing

The initially d.c. magnetized slave medium and the magnetic transfer master carrier were brought into close contact with each other. Using the system having the inclined electromagnets shown in FIG. 15, a magnetic field was applied in the opposite direction to the direction of magnetization for magnetic transfer. The angle of the electromagnet with respet to the slave medium was 45°. To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an MR head having a read head gap of 0.29 μm, a read track width of 2.3 μm, a write head gap of 0.4 μm and a write track width of 3.2 μm.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 5-1. It is noted that the asterisk mark indicates a C/N value of −20 dB or lower or that the quality of the magnetically transferred signals is far from the practical level.

TABLE 5-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −11.2 |
| 1,500 | 0.6 | −5.2 |
| 2,000 | 0.8 | −1.3 |
| 2,250 | 0.9 | −1.1 |
| 2,500 | 1.0 | 0.0 |
| 2,750 | 1.1 | −0.2 |
| 3,000 | 1.2 | −3.2 |
| 3,250 | 1.3 | −6.8 |
| 3,500 | 1.4 | −10.2 |
| 3,750 | 1.5 | −19.2 |
| 4,000 | 1.6 | * |
| 5,000 | 2.0 | * |

Example 5-2 and Comparative Example 5-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 5-1, and electromagnetic performance was estimated as in Example 5-1. The results are shown in Table 5-2. The peak strength of the transfer magnetic field shows a peak of the magnetic field profile shown in FIG. 15.

TABLE 5-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −10.0 |
| 1,500 | 0.6 | −4.9 |
| 2,000 | 0.8 | −0.1 |
| 2,250 | 0.9 | −0.2 |
| 2,500 | 1.0 | 0.0 |
| 2,750 | 1.1 | −0.2 |
| 3,000 | 1.2 | −3.6 |
| 3,250 | 1.3 | −5.6 |
| 3,500 | 1.4 | −9.6 |
| 3,750 | 1.5 | −11.2 |
| 4,000 | 1.6 | −16.8 |
| 5,000 | 2.0 | * |

Comparative Example 5-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 5-1, and electromagnetic performance was estimated as in Example 5-1. The results are shown in Table 5-3.

TABLE 5-3

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 5-3 and Comparative Example 5-4

The initial d.c. magnetization of a slave medium having a coercive force Hcs of 2,500 Oe was carried out at peak magnetic field intensitys of 5,000 Oe, 3,000 Oe and 2,000 Oe, using the electromagnets shown in FIG. 13(B). Then, the initially d.c. magnetized slave medium and a magnetic transfer master carrier were brought into close contact with each other for magnetic transfer. The magnetic transfer was carried out by the application of magnetic fields using the electromagnet system shown in FIG. 15. The results were much the same as those obtained using the system having the electromagnets shown in FIG. 14.

Example 5-4 and Comparative Example 5-5

The initial d.c. magnetization of a slave medium having a coercive force Hcs of 2,000 Oe prepared as in Example 5-1 was carried out at a peak magnetic field intensity of 4,000 Oe that was twice as high as the coercive force Hcs of the slave medium, using the electromagnets shown in FIG. 13. Then, the initially d.c. magnetized slave medium and a magnetic transfer master carrier were brought into close contact with each other for magnetic transfer. The magnetic transfer was carried out as in Example 5-1 with the exception that the system shown in FIG. 15 was used, and electromagnetic performance was estimated as in Example 5-1. The results are shown in Table 5-4. The transfer magnetic field has a magnetic field profile with the maximum peak strength, as shown in FIG. 15.

TABLE 5-4

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −10.3 |
| 1,200 | 0.6 | −3.6 |
| 1,600 | 0.8 | −0.6 |
| 1,800 | 0.9 | −0.3 |
| 2,000 | 1.0 | 0.0 |
| 2,200 | 1.1 | −0.9 |
| 2,400 | 1.2 | −1.1 |
| 2,600 | 1.3 | −4.9 |
| 2,800 | 1.4 | −12.1 |
| 3,000 | 1.5 | −19.8 |

TABLE 5-4-continued

Hcs of Slave Medium: 2,000 Oe

| Peak Strength Oe of Transfer Magnetic Field | Ratio to Hcs | ΔC/N (dB) |
|---|---|---|
| 3,200 | 1.6 | * |
| 4,000 | 2.0 | * |

The initial d.c. magnetization of a slave medium having a coercive force Hcs of 2,000 Oe was carried out at a peak magnetic field intensity of 2,400 Oe that was 1.2 times as high as the coercive force Hcs of the slave medium, using the electromagnets shown in FIG. 13. Then, the initially d.c. magnetized slave medium and a magnetic transfer master carrier were brought into close contact with each other for magnetic transfer. Otherwise, the magnetic transfer was carried out as in Example 5-1, and electromagnetic performance was estimated as in Example 5-1. The results are shown in Table 5-5. The transfer magnetic field has a magnetic field profile with the maximum peak strength, as shown in FIG. 15.

TABLE 5-5

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −17.2 |
| 1,200 | 0.6 | −2.1 |
| 1,600 | 0.8 | −2.1 |
| 1,800 | 0.9 | −0.4 |
| 2,000 | 1.0 | 0.0 |
| 2,200 | 1.1 | −0.1 |
| 2,400 | 1.2 | −1.2 |
| 2,600 | 1.3 | −4.2 |
| 2,800 | 1.4 | −10.8 |
| 3,000 | 1.5 | −18.7 |
| 3,200 | 1.6 | * |
| 4,000 | 2.0 | * |

Comparative Example 5-7

The initial d.c. magnetization of a slave medium having a coercive force Hcs of 2,000 Oe prepared as in Example 5-1 was carried out at a peak magnetic field intensity of 1,600 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 5-1 with the exception that the system shown in FIG. 15 was used, and electromagnetic performance was estimated as in Example 5-1. The results are shown in Table 5-6. The transfer magnetic field has a magnetic field profile with the maximum peak strength, as shown in FIG. 15(B).

TABLE 5-6

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | * |
| 1,200 | 0.6 | * |

TABLE 5-6-continued

Hcs of Slave Medium: 2,000 Oe

| Peak Strength Oe of Transfer Magnetic Field | Ratio to Hcs | ΔC/N (dB) |
|---|---|---|
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

Example 5-6 and Comparative Example 5-8

The initial d.c. magnetization of a slave medium having a coercive force Hcs of 2,000 Oe was carried out at peak magnetic field intensitys of 4,000 Oe, 2,400 Oe and 1,600 Oe using the electromagnets shown in FIG. 14(A). The initially d.c. magnetized slave medium and a master carrier were brought in close contact with each other for magnetic transfer. The magnetic transfer was carried out by using the electromagnet system shown in FIG. 15(A) to apply a magnetic field to the integral piece. The results are much the same as those obtained with the system comprising the electromagnets shown in FIG. 13(A).

Example 6-1 and Comparative Example 6-1

Preparation of Master Carrier

A vacuum film deposition system was evacuated at room temperature to $10^{-7}$ Torr, and argon was then introduced in the system until the condition of $3 \times 10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising 10 μ wide radial lines at regular intervals and a 20 mm to 40 mm position in the radial direction from the center of the disk, with a line interval of 10 μm at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3 \times 10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out by locating electromagnets as shown in FIG. 16(A) such that a peak magnetic field intensity of 5,000 Oe that was twice as high as the coercive force Hcs of the slave medium was obtained on the surface of the slave medium.

Magnetic Transfer Testing

The initially d.c. magnetized slave medium and the magnetic transfer master carrier were brought into close contact with each other. Using the system having electromagnets on both its sides as shown in FIG. 17(A), a magnetic field was applied in the opposite direction to the direction of magnetization for magnetic transfer. To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an MR head having a read head gap of 0.35 μm, a read track width of 3.1 μm, a write head gap of 0.4 μm and a write track width of 3.0 μm.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 6-1. It is noted that the asterisk mark indicates a C/N value of –20 dB or lower or that the quality of the magnetically transferred signals is far from the practical level.

TABLE 6-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | –16.8 |
| 1,500 | 0.6 | –3.2 |
| 2,000 | 0.8 | –1.5 |
| 2,250 | 0.9 | –0.3 |
| 2,500 | 1.0 | 0.0 |
| 2,750 | 1.1 | –0.1 |
| 3,000 | 1.2 | –2.1 |
| 3,250 | 1.3 | –3.8 |
| 3,500 | 1.4 | –10.2 |
| 3,750 | 1.5 | –19.9 |
| 4,000 | 1.6 | * |
| 5,000 | 2.0 | * |

Example 6-2 and Comparative Example 6-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 6-1, and electromagnetic performance was estimated as in Example 6-1. The results are shown in Table 6-2. The peak strength of the transfer magnetic field shows a peak of the magnetic field profile shown in FIG. 17(B).

TABLE 6-2

| Hcs of Slave Medium: 2,500 Oe | | |
| --- | --- | --- |
| Peak Strength Oe of Transfer Magnetic Field | Ratio to Hcs | ΔC/N (dB) |
| 750 | 0.3 | * |
| 1,250 | 0.5 | −10.6 |
| 1,500 | 0.6 | −5.2 |
| 2,000 | 0.8 | −1.2 |
| 2,250 | 0.9 | 0.0 |
| 2,500 | 1.0 | −0.6 |
| 2,750 | 1.1 | −0.7 |
| 3,000 | 1.2 | −2.3 |
| 3,250 | 1.3 | −2.9 |
| 3,500 | 1.4 | −9.6 |
| 3,750 | 1.5 | −18.4 |
| 4,000 | 1.6 | * |
| 5,000 | 2.0 | * |

Comparative Example 6-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 6-1, and electromagnetic performance was estimated as in Example 6-1. The results are shown in Table 6-3. The transfer magnetic peak strength shows a peak of the magnetic field intensity profile of FIG. 17(B).

TABLE 6-3

| Hcs of Slave Medium: 2,500 Oe | | |
| --- | --- | --- |
| Peak Strength Oe of Transfer Magnetic Field | Ratio to Hcs | ΔC/N (dB) |
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 6-3 and Comparative Example 6-4

The initial d.c. magnetization of a slave medium having a coercive force Hcs of 2,000 Oe prepared as in Example 6-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer. The magnetic transfer was carried out as in Example 6-1 with the exception that the system shown in FIG. 17(A) was used, and electromagnetic performance was estimated as in Example 6-1. The results are shown in Table 6-4. The transfer magnetic field peak strength shows a peak of the magnetic field intensity profile of FIG. 17(B).

TABLE 6-4

| Hcs of Slave Medium: 2,000 Oe | | |
| --- | --- | --- |
| Peak Strength Oe of Transfer Magnetic Field | Ratio to Hcs | ΔC/N (dB) |
| 600 | 0.3 | * |
| 1,000 | 0.5 | −16.3 |
| 1,200 | 0.6 | −2.6 |
| 1,600 | 0.8 | −2.3 |
| 1,800 | 0.9 | −0.2 |
| 2,000 | 1.0 | 0.0 |
| 2,200 | 1.1 | −0.3 |
| 2,400 | 1.2 | −0.9 |
| 2,600 | 1.3 | −3.1 |
| 2,800 | 1.4 | −12.3 |
| 3,000 | 1.5 | −16.9 |
| 3,200 | 1.6 | * |
| 4,000 | 2.0 | * |

Example 6-4 and Comparative Example 6-5

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer. Thereafter, electromagnetic performance was estimated as in Example 6-1. The results are shown in Table 6-5. The transfer magnetic field peak strength has a peak of the magnetic field intensity profile of FIG. 17(B).

TABLE 6-5

| Hcs of Slave Medium: 2,000 Oe | | |
| --- | --- | --- |
| Peak Strength Oe of Transfer Magnetic Field | Ratio to Hcs | ΔC/N (dB) |
| 600 | 0.3 | * |
| 1,000 | 0.5 | −16.3 |
| 1,200 | 0.6 | −2.2 |
| 1,600 | 0.8 | −0.8 |
| 1,800 | 0.9 | 0.0 |
| 2,000 | 1.0 | −0.2 |
| 2,200 | 1.1 | −0.3 |
| 2,400 | 1.2 | −3.8 |
| 2,600 | 1.3 | −5.9 |
| 2,800 | 1.4 | −9.6 |
| 3,000 | 1.5 | −18.2 |
| 3,200 | 1.6 | * |
| 4,000 | 2.0 | * |

Comparative Example 6-6

The initial d.c. magnetization of a slave medium having a coercive force Hcs of 2,000 Oe prepared as in Example 6-1 was carried out at a peak magnetic field intensity of 1,600 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 6-1 with the exception that the system shown in FIG. 17(A) was used, and electromagnetic performance was estimated as in Example 6-1. The results are shown in Table 6-6. The transfer magnetic field peak strengh shows a peak of the magnetic field intensity profile of FIG. 17(B).

TABLE 6-6

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

Example 7-1 and Comparative Example 7-1

Preparation of Master Carrier

A vacuum film deposition system was evacuated at room temperature to $10^{-7}$ Torr, and argon was then introduced in the system until the condition of $3\times10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising $10\,\mu$ wide radial lines at regular intervals and a 20 mm to 40 mm position in the radial direction from the center of the disk, with a line interval of $10\,\mu$m at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3\times10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out by locating electromagnets on both its surface sides as shown in FIG. 18(A) such that a peak magnetic field intensity of 5,000 Oe that was twice as high as the coercive force Hcs of the slave medium was obtained on the surface of the slave medium.

Magnetic Transfer Testing

The initially d.c. magnetized slave medium and the magnetic transfer master carrier were brought into close contact with each other. Using the system having electromagnets on both its surface sides as shown in FIG. 19(A), a magnetic field was applied in the opposite direction to the direction of magnetization for magnetic transfer. To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an MR head having a read head gap of $0.34\,\mu$m, a read track width of $3.1\,\mu$m, a write head gap of $0.4\,\mu$m and a write track width of $3.1\,\mu$m.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 7-1. It is noted that the asterisk mark indicates a C/N value of −20 dB or lower or that the quality of the magnetically transferred signals is far from the practical level.

TABLE 7-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −16.2 |
| 1,500 | 0.6 | −3.5 |
| 2,000 | 0.8 | −1.2 |
| 2,250 | 0.9 | −0.3 |
| 2,500 | 1.0 | 0.0 |
| 2,750 | 1.1 | −0.1 |
| 3,000 | 1.2 | −0.3 |
| 3,250 | 1.3 | −6.1 |
| 3,500 | 1.4 | −10.5 |
| 3,750 | 1.5 | −18.4 |
| 4,000 | 1.6 | * |
| 5,000 | 2.0 | * |

Example 7-2 and Comparative Example 7-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 7-1, and electromagnetic performance was estimated as in Example 7-1. The results are shown in Table 7-2. The peak strength of the transfer magnetic field shows a peak of the magnetic field profile shown in FIG. 19(B).

TABLE 7-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −13.5 |
| 1,500 | 0.6 | −4.9 |
| 2,000 | 0.8 | −0.3 |
| 2,250 | 0.9 | 0.0 |
| 2,500 | 1.0 | −0.1 |
| 2,750 | 1.1 | −0.3 |
| 3,000 | 1.2 | −0.9 |
| 3,250 | 1.3 | −6.8 |
| 3,500 | 1.4 | −16.2 |

TABLE 7-2-continued

Hcs of Slave Medium: 2,500 Oe

| Peak Strength Oe of Transfer Magnetic Field | Ratio to Hcs | ΔC/N (dB) |
|---|---|---|
| 3,750 | 1.5 | −18.7 |
| 4,000 | 1.6 | * |
| 5,000 | 2.0 | * |

Comparative Example 7-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 7-1, and electromagnetic performance was estimated as in Example 7-1. The results are shown in Table 7-3. The peak strength of the transfer magnetic field shows a peak of the magnetic field profile shown in FIG. 19(B).

TABLE 7-3

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 7-3 and Comparative Example 7-4

The initial d.c. magnetization of a slave medium having a coercive force Hcs of 2,000 Oe prepared as in Example 7-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer. The magnetic transfer was carried out as in Example 7-1 with the exception that the system shown in FIG. 19(A) was used, and electromagnetic performance was estimated as in Example 7-1. The results are shown in Table 7-4. The peak strength of the transfer magnetic field shows a peak of the magnetic field profile shown in FIG. 19(B).

TABLE 7-4

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −10.5 |
| 1,200 | 0.6 | −3.2 |
| 1,600 | 0.8 | −2.3 |
| 1,800 | 0.9 | −0.2 |
| 2,000 | 1.0 | 0.0 |
| 2,200 | 1.1 | −0.3 |
| 2,400 | 1.2 | −3.7 |
| 2,600 | 1.3 | −5.5 |
| 2,800 | 1.4 | −8.5 |
| 3,000 | 1.5 | −16.2 |
| 3,200 | 1.6 | * |
| 4,000 | 2.0 | * |

Example 7-4 and Comparative Example 7-5

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 7-1, and electromagnetic performance was estimated as in Example 7-1. The results are shown in Table 7-5. The peak strength of the transfer magnetic field shows a peak of the magnetic field profile shown in FIG. 19(B).

TABLE 7-5

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −15.2 |
| 1,200 | 0.6 | −2.3 |
| 1,600 | 0.8 | −0.9 |
| 1,800 | 0.9 | 0.0 |
| 2,000 | 1.0 | −0.2 |
| 2,200 | 1.1 | −0.1 |
| 2,400 | 1.2 | −3.8 |
| 2,600 | 1.3 | −6.3 |
| 2,800 | 1.4 | −11.2 |
| 3,000 | 1.5 | −17.4 |
| 3,200 | 1.6 | * |
| 4,000 | 2.0 | * |

Comparative Example 7-6

The initial d.c. magnetization of a slave medium having a coercive force Hcs of 2,000 Oe prepared as in Example 7-1 was carried out at a peak magnetic field intensity of 1,600 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 7-1 with the exception that the system shown in FIG. 19(A) was used, and electromagnetic performance was estimated as in Example 7-1. The results are shown in Table 7-6. The peak strength of the transfer magnetic field shows a peak of the magnetic field profile shown in FIG. 19(B).

TABLE 7-6

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

Example 8-1 and Comparative Example 8-1

Preparation of Master Carrier

A vacuum film deposition system was evacuated at room temperature to $10^{-7}$ Torr, and argon was then introduced in the system until the condition of $3\times10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising 10 μ wide radial lines at regular intervals and a 20 mm to 40 mm position in the radial direction from the center of the disk, with a line interval of 10 μm at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3\times10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out while electromagnets were located as shown in FIG. 20(A) such that a peak magnetic field intensity of 5,000 Oe that was twice as high as the coercive force Hcs of the slave medium was obtained on the surface of the slave medium.

Magnetic Transfer Testing

The initially d.c. magnetized slave medium and the magnetic transfer master carrier were brought into close contact with each other. Using the system having the electromagnets shown in FIG. 21(A), a magnetic field was applied in the opposite direction to the direction of magnetization for magnetic transfer., To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an inductive head having a head gap of 0.30 μm and a track width of 2.2 μm.

Output signals were subjected to frequency analysis using a spectro-analyzer to find a difference (C/N) between the peak strength of the primary signal (C) and extrapolated medium noise (N). Assuming that the maximum value of C/N at each magnetic field intensity was 0 dB, estimation was made in terms of relative values (ΔC/N). The results are shown in Table 8-1. It is noted that the asterisk mark indicates a C/N value of −20 dB or lower or that the quality of the magnetically transferred signals is far from the practical level.

TABLE 8-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −10.8 |
| 1,500 | 0.6 | −4.1 |
| 2,000 | 0.8 | −1.9 |
| 2,250 | 0.9 | −0.8 |
| 2,500 | 1.0 | 0.0 |
| 2,750 | 1.1 | −0.2 |
| 3,000 | 1.2 | −1.8 |
| 3,250 | 1.3 | −9.3 |
| 3,500 | 1.4 | −12.5 |
| 3,750 | 1.5 | −16.8 |
| 4,000 | 1.6 | * |
| 5,000 | 2.0 | * |

Example 8-2 and Comparative Example 8-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 8-1, and electromagnetic performance was estimated as in Example 8-1. The results are shown in Table 8-2. The peak strength of the transfer magnetic field shows a peak of the magnetic field profile shown in FIG. 21(B).

TABLE 8-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −13.6 |
| 1,500 | 0.6 | −2.2 |
| 2,000 | 0.8 | −1.8 |
| 2,250 | 0.9 | −0.2 |
| 2,500 | 1.0 | 0.0 |
| 2,750 | 1.1 | −0.2 |
| 3,000 | 1.2 | −0.9 |
| 3,250 | 1.3 | −7.9 |
| 3,500 | 1.4 | −9.8 |
| 3,750 | 1.5 | −16.8 |

TABLE 8-2-continued

Hcs of Slave Medium: 2,500 Oe

| Peak Strength Oe of Transfer Magnetic Field | Ratio to Hcs | ΔC/N (dB) |
|---|---|---|
| 4,000 | 1.6 | * |
| 5,000 | 2.0 | * |

Comparative Example 8-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 8-1, and electromagnetic performance was estimated as in Example 8-1. The results are shown in Table 8-3. The peak strength of the transfer magnetic field shows a peak of the magnetic field intensity profile of FIG. 21.

TABLE 8-3

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 8-3 and Comparative Example 8-4

The initial d.c. magnetization of a slave medium having a coercive force Hcs of 2,000 Oe prepared as in Example 8-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer. The magnetic transfer was carried out as in Example 8-1 with the exception that the system shown in FIG. 21(A) was used, and electromagnetic performance was estimated as in Example 8-1. The results are shown in Table 8-4. The transfer magnetic field peak strength shows a peak of the magnetic field intensity profile of FIG. 21(B).

TABLE 8-4

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −15.2 |

TABLE 8-4-continued

Hcs of Slave Medium: 2,000 Oe

| Peak Strength Oe of Transfer Magnetic Field | Ratio to Hcs | ΔC/N (dB) |
|---|---|---|
| 1,200 | 0.6 | −2.4 |
| 1,600 | 0.8 | −1.8 |
| 1,800 | 0.9 | −0.5 |
| 2,000 | 1.0 | 0.0 |
| 2,200 | 1.1 | −0.9 |
| 2,400 | 1.2 | −1.2 |
| 2,600 | 1.3 | −6.7 |
| 2,800 | 1.4 | −14.7 |
| 3,000 | 1.5 | −18.5 |
| 3,200 | 1.6 | * |
| 4,000 | 2.0 | * |

Example 8-4 and Comparative Example 8-5

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 8-1, and electromagnetic performance was estimated as in Example 8-1. The results are shown in Table 8-5. The transfer magnetic field peak strength shows a peak of the magnetic field intensity profile of FIG. 21(A).

TABLE 8-5

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | −12.6 |
| 1,200 | 0.6 | −4.3 |
| 1,600 | 0.8 | −2.3 |
| 1,800 | 0.9 | −0.3 |
| 2,000 | 1.0 | 0.0 |
| 2,200 | 1.1 | −0.1 |
| 2,400 | 1.2 | −1.8 |
| 2,600 | 1.3 | −6.9 |
| 2,800 | 1.4 | −13.6 |
| 3,000 | 1.5 | −17.4 |
| 3,200 | 1.6 | * |
| 4,000 | 2.0 | * |

Comparative Example 8-6

The initial d.c. magnetization of a slave medium having a coercive force Hcs of 2,000 Oe prepared as in Example 8-1 was carried out at a peak magnetic field intensity of 1,600 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 8-1 with the exception that the system shown in FIG. 21(A) was used, and electromagnetic performance was estimated as in Example 8-1. The results are shown in Table 8-6. The transfer magnetic field peak strength shows a peak of the magnetic field intensity profile of FIG. 21(A).

TABLE 8-6

Hcs of Slave Medium: 2,000 Oe

| Peak Strength Oe of Transfer Magnetic Field | Ratio to Hcs | ΔC/N (dB) |
|---|---|---|
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

Example 9-1 and Comparative Example 9-1

Preparation of Master Carrier

A vacuum film deposition system was evacuated at room temperature to $10^{-7}$ Torr, and argon was then introduced in the system until the condition of $3\times10^{-3}$ Torr was obtained. Under this condition, an FeCo film of 200 nm in thickness was formed on a silicon substrate to prepare a disk-like master carrier of 3.5 inches in diameter.

The master carrier was found to have a coercive force Hc of 100 Oe and a magnetic flux density Ms of 23,000 gausses.

The master carrier was then provided thereon with a disk-like pattern comprising 10 μ wide radial lines at regular intervals and a 20 mm to 40 mm position in the radial direction from the center of the disk, with a line interval of 10 μm at the innermost position spaced 20 mm away from the center of the disk in the radial direction.

Preparation of Slave Medium

A vacuum film deposition system was evacuated at room temperature to $10^{-7}$ Torr, and argon was then introduced in the system until the condition of $3\times10^{-3}$ Torr was obtained. Under this condition, a glass plate was heated to 200° C. to prepare a disk form of magnetic recording medium of 3.5 inches in diameter, which was found to have a 25 nm thick CoCrPt film with an Ms of 4,500 gausses and a coercive force Hcs of 2,500 Oe.

Initial DC Magnetization

The initial d.c. magnetization of the slave medium was carried out by locating electromagnets on both its surface sides as shown in FIG. 22(A) such that a peak magnetic field intensity of 5,000 Oe that was twice as high as the coercive force Hcs of the slave medium was obtained on the surface of the slave medium.

Magnetic Transfer Testing

The initially d.c. magnetized slave medium and the magnetic transfer master carrier were brought into close contact with each other. Using the system having an annular electromagnet as shown in FIG. 24(A), a magnetic field was applied in the opposite direction to the direction of magnetization for magnetic transfer. To bring the slave medium and the magnetic transfer master carrier in close contact with each other, pressure was applied from above an aluminum plate having a rubber plate provided on its lower side.

Estimation of Electromagnetic Performance

Signals transferred to the slave medium were estimated using an electromagnetic performance measuring device (SS-60 made by Kyodo Denshi Co., Ltd.). For the head, use was made of an inductive head having a head-gap 0.35 μm and a track width of 3.5 μm.

Output signals were subjected to frequency analysis using a spectro-analyzer to find a difference (C/N) between I the peak strength of the primary signal (C) and extrapolated medium noise (N). Assuming that the maximum value of C/N at each magnetic field intensity was 0 dB, estimation was made in terms of relative values (ΔC/N). The results are shown in Table 9-1. It is noted that the asterisk mark indicates a C/N value of −20 dB or lower or that the quality of the magnetically transferred signals is far from the practical level.

TABLE 9-1

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −13.6 |
| 1,500 | 0.6 | −3.5 |
| 2,000 | 0.8 | −1.3 |
| 2,250 | 0.9 | −0.2 |
| 2,500 | 1.0 | 0.0 |
| 2,750 | 1.1 | −0.1 |
| 3,000 | 1.2 | −2.4 |
| 3,250 | 1.3 | −4.2 |
| 3,500 | 1.4 | −8.9 |
| 3,750 | 1.5 | −16.8 |
| 4,000 | 1.6 | * |
| 5,000 | 2.0 | * |

Example 9-2 and Comparative Example 9-2

The initial d.c. magnetization of a slave medium having a coercive force Hcs of 2,500 Oe was carried out at a peak magnetic field intensity of 3,000 Oe that was 1.2 times as high as the coercive force Hcs of the slave medium. Then, the initially d.c. magnetized slave medium and a magnetic transfer master carrier were brought into close contact with each other for magnetic transfer. Otherwise, the magnetic transfer was carried out as in Example 9-1, and electromagnetic performance was estimated as in Example 9-1. The results are shown in Table 9-2.

TABLE 9-2

Hcs of Slave Medium: 2,500 Oe

| Peak Strength Oe of Transfer Magnetic Field | Ratio to Hcs | ΔC/N (dB) |
|---|---|---|
| 750 | 0.3 | * |
| 1,250 | 0.5 | −13.6 |
| 1,500 | 0.6 | −2.3 |
| 2,000 | 0.8 | −1.8 |
| 2,250 | 0.9 | −0.2 |
| 2,500 | 1.0 | 0.0 |
| 2,750 | 1.1 | −0.1 |
| 3,000 | 1.2 | −1.2 |
| 3,250 | 1.3 | −4.6 |
| 3,500 | 1.4 | −9.7 |
| 3,750 | 1.5 | −18.2 |
| 4,000 | 1.6 | * |
| 5,000 | 2.0 | * |

Comparative Example 9-3

The initial d.c. magnetization of a slave medium having a coercive force Hcs of 2,500 Oe was carried out at a peak magnetic field intensity of 2,000 Oe that was four-fifths of the coercive force Hcs of the slave medium. Then, the initially d.c. magnetized slave medium and a magnetic transfer master carrier were brought into close contact with each other for magnetic transfer. Otherwise, the magnetic transfer was carried out as in Example 9-1, and electromagnetic performance was estimated as in Example 9-1. The results are shown-in Table 9-3.

TABLE 9-3

Hcs of Slave Medium: 2,500 Oe

| Peak Strength Oe of Transfer Magnetic Field | Ratio to Hcs | ΔC/N (dB) |
| --- | --- | --- |
| 750 | 0.3 | * |
| 1,250 | 0.5 | * |
| 1,500 | 0.6 | * |
| 2,000 | 0.8 | * |
| 2,250 | 0.9 | * |
| 2,500 | 1.0 | * |
| 2,750 | 1.1 | * |
| 3,000 | 1.2 | * |
| 3,250 | 1.3 | * |
| 3,500 | 1.4 | * |
| 3,750 | 1.5 | * |
| 4,000 | 1.6 | * |
| 5,000 | 2.0 | * |

Example 9-3 and Comparative Example 9-4

The initial d.c. magnetization of a slave medium having a coercive force Hcs of 2,000 Oe prepared as in Example 9-1 was carried out at a peak magnetic field intensity of 4,000 Oe that was twice as high as the coercive force Hcs of the slave medium. Then, the initially d.c. magnetized slave medium and a magnetic transfer master carrier were brought into close contact with each other for magnetic transfer. The magnetic transfer was carried out as in Example 9-1 with the exception that the system shown in FIG. 24(A) was used, and electromagnetic performance was estimated as in Example 9-1. The results are shown in Table 9-4.

TABLE 9-4

Hcs of Slave Medium: 2,000 Oe

| Peak Strength Oe of Transfer Magnetic Field | Ratio to Hcs | ΔC/N (dB) |
| --- | --- | --- |
| 600 | 0.3 | * |
| 1,000 | 0.5 | −10.5 |
| 1,200 | 0.6 | −3.2 |
| 1,600 | 0.8 | −0.6 |
| 1,800 | 0.9 | −0.2 |
| 2,000 | 1.0 | 0.0 |
| 2,200 | 1.1 | −0.3 |
| 2,400 | 1.2 | −2.9 |
| 2,600 | 1.3 | −7.3 |
| 2,800 | 1.4 | −10.2 |
| 3,000 | 1.5 | −18.4 |
| 3,200 | 1.6 | * |
| 4,000 | 2.0 | * |

Example 9-4 and Comparative Example 9-5

The initial d.c. magnetization of a slave medium having a coercive force Hcs of 2,000 Oe was carried out at a peak magnetic field intensity of 2,400 Oe that was 1.2 times as high as the coercive force Hcs of the slave medium. Then, the initially d.c. magnetized slave medium and a magnetic transfer master carrier were brought into close contact with each other for magnetic transfer, as in Example 9-4. Thereafter, electromagnetic performance was estimated as in Example 9-1. The results are shown in Table 9-5.

TABLE 9-5

Hcs of Slave Medium: 2,000 Oe

| Peak Strength Oe of Transfer Magnetic Field | Ratio to Hcs | ΔC/N (dB) |
| --- | --- | --- |
| 600 | 0.3 | * |
| 1,000 | 0.5 | −10.7 |
| 1,200 | 0.6 | −3.2 |
| 1,600 | 0.8 | −0.6 |
| 1,800 | 0.9 | −0.1 |
| 2,000 | 1.0 | 0.0 |
| 2,200 | 1.1 | −0.5 |
| 2,400 | 1.2 | −3.5 |
| 2,600 | 1.3 | −5.2 |
| 2,800 | 1.4 | −9.8 |
| 3,000 | 1.5 | −18.7 |
| 3,200 | 1.6 | * |
| 4,000 | 2.0 | * |

Comparative Example 9-6

The initial d.c. magnetization of a slave medium having a coercive force Hcs of 2,000 Oe prepared as in Example 9-1 was carried out at a peak magnetic field intensity of 1,600 Oe that was four-fifths of the coercive force Hcs of the slave medium. Then, the initially d.c. magnetized slave medium and a magnetic transfer master carrier were brought into close contact with each other for magnetic transfer. The magnetic transfer was carried out as in Example 9-1 with the exception that the system shown in FIG. 24(A) was used, and electromagnetic performance was estimated as in Example 9-1. The results are shown in Table 9-6.

TABLE 9-6

Hcs of Slave Medium: 2,000 Oe

| Peak Strength Oe of Transfer Magnetic Field | Ratio to Hcs | ΔC/N (dB) |
| --- | --- | --- |
| 600 | 0.3 | * |
| 1,000 | 0.5 | * |
| 1,200 | 0.6 | * |
| 1,600 | 0.8 | * |
| 1,800 | 0.9 | * |
| 2,000 | 1.0 | * |
| 2,200 | 1.1 | * |
| 2,400 | 1.2 | * |
| 2,600 | 1.3 | * |
| 2,800 | 1.4 | * |
| 3,000 | 1.5 | * |
| 3,200 | 1.6 | * |
| 4,000 | 2.0 | * |

What we claim is:

1. A magnetic transfer method in which a magnetic transfer master carrier having a magnetic layer at a surface portion of a substrate having an information signal is brought in close contact with an associated slave medium and a transfer magnetic field is applied to the slave medium, wherein:

a magnetic field is previously applied to said slave medium in a track direction to initially d.c. magnetize said slave medium in said track direction, and said magnetic transfer master carrier is brought in close contact with said initially d.c. magnetized slave medium to apply said transfer magnetic field to said slave medium in said track direction for magnetic transfer, wherein an angle of inclination of said transfer magnetic field is variable, and wherein a magnetic field having a magnetic field intensity profile having a magnetic field intensity portion exceeding said coercive force Hcs of said slave member at at least one position in said track direction is generated at a part of said track direction to rotate said slave medium or said magnetic field in said track direction, so that said magnetic field for said initial d.c. magnetization of said slave medium in said track direction is applied to said slave medium.

2. The magnetic transfer method according to claim 1, wherein said magnetic layer of said magnetic transfer master carrier has a coercive force Hcm of 600 Oe (48 kA/m) or lower.

3. The magnetic transfer method according to claim 1, wherein said associated slave medium has a coercive force Hcs of 1,800 Oe (143 kA/m) or more.

4. The magnetic transfer method according to claim 1, wherein the direction of said initial d.c. magnetization of said slave medium by application of said magnetic field in said track direction is opposite on a slave medium surface to that of said transfer magnetic field applied for magnetic transfer.

5. The magnetic transfer method according to claim 1, wherein a magnetic field having a magnetic field intensity profile, which has a magnetic field intensity portion exceeding said coercive force Hcs of said slave medium in one direction alone at a track direction position and in which a magnetic strength in an opposite direction is less than said coercive force Hcs of said slave medium at any track direction position, is generated at a part of said track direction to rotate said slave medium or said magnetic field in said track direction, so that said magnetic field for said initial d.c. magnetization of said slave medium in said track direction is applied to said slave medium.

6. The magnetic transfer method according to claim 1, wherein a magnetic field having a magnetic field intensity profile, in which a magnetic strength exceeding a maximum value of an optimum transfer magnetic field intensity range is absent in any track direction, at least one portion having a magnetic field intensity within said optimum transfer magnetic strength field range is present in one track direction and a magnetic field intensity in an opposite direction thereto is less than a minimum value of said optimum transfer magnetic field intensity range at any track direction position, is generated at a part of said track direction to rotate said slave medium in said track direction while said initially d.c. magnetized slave medium is brought in close contact with said or rotate said magnetic field in said track direction, so that said transfer magnetic field is applied to a slave medium surface in said track direction.

7. The magnetic transfer method according to claim 1, wherein a magnetic pole axis of a permanent magnet is located vertically on one of upper and lower surface sides of said slave medium to apply to said slave medium a magnetic field symmetrical with respect to said magnetic pole axis to rotate said slave medium or said permanent magnet in said track direction, so that said slave medium is initially d.c. magnetized in said track direction.

8. The magnetic transfer method according to claim 5, wherein a magnetic pole axis of a permanent magnet is located obliquely with respect to a slave medium surface to make an asymmetrical magnetic field intensity profile in said track direction and rotate said slave medium or said permanent magnet in said track direction, so that said slave medium is initially d.c. magnetized in said track direction.

9. The magnetic transfer method according to claim 6, wherein an axis of a magnetic pole of a permanent magnet is located obliquely with respect to a slave medium surface to make an asymmetrical magnetic field intensity profile in said track direction and said initially d.c. magnetized slave medium is rotated in said track direction while said slave medium is brought in close contact with said magnetic transfer master carrier or said magnetic field is rotated in said track direction, so that said transfer magnetic field is applied to said slave medium in said track direction.

10. The magnetic transfer method according to claim 6 or 9, wherein an optimum transfer magnetic field intensity is given by 0.6×Hcs to 1.3×Hcs where Hcs is the coercive force of said slave medium.

11. A magnetic transfer system in which a magnetic transfer master carrier having a magnetic layer at a surface portion of a substrate having an information signal is brought in close contact with an associated slave medium and a transfer magnetic field is applied to the slave medium, which comprises:

initial d.c. magnetization means for previously applying a magnetic field to said slave medium in a track direction to initially d.c. magnetize said slave medium in said track direction, and transfer magnetic field application means for applying a transfer magnetic field to said initially d.c. magnetized slave medium in said track direction while said magnetic transfer master carrier is brought in close contact with said initially d.c. magnetized slave medium, wherein an angle of inclination of said transfer magnetic field is variable, and wherein said initial d.c. magnetization means comprises means for generating a magnetic field having a magnetic field intensity profile which has a magnetic field intensity portion exceeding said coercive force Hcs of said slave member at at least one position in said track direction, at a part of said track direction and rotating said slave medium or said magnetic field in said track direction.

12. The magnetic transfer system according to claim 11, wherein said magnetic layer of said magnetic transfer master carrier has a coercive force Hcm of 600 Oe (48 kA/m) or lower.

13. The magnetic transfer system according to claim 11, wherein said associated slave medium has a coercive force Hcs of 1,800 Oe (143 kA/m) or more.

14. The magnetic transfer system according to claim 11, wherein the direction of said initial d.c. magnetization of said slave medium by application of said magnetic field in said track direction is opposite on a slave medium surface to said transfer magnetic field applied for magnetic transfer.

15. The magnetic transfer system according to claim 11, wherein said initial d.c. magnetization means comprises means for generating a magnetic field having a magnetic field intensity profile, which has a magnetic field intensity portion exceeding said coercive force Hcs of said slave medium in one direction alone at a track direction position and in which a magnetic strength in an opposite direction is less than said coercive force Hcs of said slave medium at any track direction position, at a part of said track direction to rotate said slave medium or said magnetic field in said track direction, so that said magnetic field for said initial d.c. magnetization of said slave medium in said track direction is applied to said slave medium.

16. The magnetic transfer system according to claim 11, wherein said transfer magnetic field application means comprises means for generating a magnetic field having a magnetic field intensity profile, in which a magnetic strength exceeding a maximum value of an optimum transfer magnetic field intensity range is absent in any track direction, at least one portion having a magnetic field intensity within said optimum transfer magnetic strength field range is present in one track direction and a magnetic field intensity in an opposite direction thereto is less than a minimum value of said optimum transfer magnetic field intensity range at any track direction position, at a part of said track direction, and means for rotating said slave medium in said track direction while said initially d.c. magnetized slave medium is brought in close contact with said or rotating said magnetic field in said track direction, so that said transfer magnetic field is applied to a slave medium surface in said track direction.

17. The magnetic transfer system according to claim 11, which comprises initial d.c. magnetization means including a single permanent magnet for locating a magnetic pole axis of said permanent magnet vertically on one of upper and lower surface sides of said slave medium to apply to said slave medium a magnetic field symmetrical with respect to said magnetic pole axis, and means for rotating said slave medium or said permanent magnet in said track direction, so that said slave medium is initially d.c. magnetized in said track direction.

18. The magnetic transfer system according to claim 15, which comprises initial d.c. magnetization means including a single permanent magnet for locating a magnetic pole axis of said permanent magnet obliquely with respect to a slave medium surface to make an asymmetrical magnetic field intensity profile in said track direction and means for rotating said slave medium or said permanent magnet in said track direction, so that said slave medium is initially d.c. magnetized in said track direction.

19. The magnetic transfer system according to claim 16 above, wherein said transfer magnetic field application means comprises a single permanent magnet magnetized in a vertical direction with respect to a slave medium surface and located obliquely with respect to said slave medium surface and on one of upper and lower surface sides of said slave medium to make an asymmetrical magnetic field intensity profile in said track direction and means for rotating said initially d.c. magnetized slave medium in said track direction while said slave medium is brought in close contact with said magnetic transfer master carrier or rotating said magnetic field in said track direction, so that said transfer magnetic field is applied to said slave medium in said track direction for magnetic transfer.

20. The magnetic transfer system according to claim 16 or 19, wherein an optimum transfer magnetic field intensity is given by $0.6 \times Hcs$ to $1.3 \times Hcs$ where Hcs is the coercive force of said slave medium.

* * * * *